(12) United States Patent
Soma et al.

(10) Patent No.: US 8,797,313 B2
(45) Date of Patent: Aug. 5, 2014

(54) DRIVING METHOD FOR DISCHARGE LAMP, DRIVING DEVICE FOR DISCHARGE LAMP, LIGHT SOURCE DEVICE, AND IMAGE DISPLAY APPARATUS

(75) Inventors: Shigeyasu Soma, Muroran (JP); Tetsuo Terashima, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1034 days.

(21) Appl. No.: 12/629,464

(22) Filed: Dec. 2, 2009

(65) Prior Publication Data

US 2010/0141634 A1 Jun. 10, 2010

(30) Foreign Application Priority Data

Dec. 5, 2008 (JP) ................................ 2008-310805
Jun. 4, 2009 (JP) ................................ 2009-134872

(51) Int. Cl.
*G06F 3/038* (2013.01)
*H05B 41/24* (2006.01)

(52) U.S. Cl.
USPC .......................................... 345/212; 315/246

(58) Field of Classification Search
None
See application file for complete search history.

(56) References Cited

U.S. PATENT DOCUMENTS

| | | | |
|---|---|---|---|
| 5,365,151 A | 11/1994 | Spiegel et al. | |
| 6,943,503 B2 * | 9/2005 | Ozasa et al. | 315/224 |
| 7,023,144 B2 | 4/2006 | Suzuki et al. | |
| 7,170,237 B2 | 1/2007 | Suzuki et al. | |
| 7,253,568 B2 * | 8/2007 | Sugaya et al. | 315/291 |
| 2004/0090184 A1 | 5/2004 | Arimoto et al. | |
| 2008/0024853 A1 * | 1/2008 | Tanaka et al. | 359/238 |
| 2008/0297739 A1 | 12/2008 | Yamauchi et al. | |
| 2011/0025222 A1 | 2/2011 | Nagase et al. | |

FOREIGN PATENT DOCUMENTS

| | | |
|---|---|---|
| JP | 2006-059790 A | 3/2006 |
| JP | 3851343 B | 11/2006 |
| JP | 2006-332015 A | 12/2006 |
| JP | 2007-087637 A | 4/2007 |
| JP | 2007-250236 A | 9/2007 |
| JP | 2008-034187 A | 2/2008 |
| JP | 2008-192388 A | 8/2008 |
| JP | 2009-252577 A | 10/2009 |

OTHER PUBLICATIONS

European Search Report, Mar. 4, 2010, issued in related Patent Application No. EP-09177342.

* cited by examiner

*Primary Examiner* — Joseph Haley
*Assistant Examiner* — Emily Frank
(74) *Attorney, Agent, or Firm* — ALG Intellectual Property, LLC

(57) ABSTRACT

In at least one embodiment of the disclosure, a driving device for a discharge lamp includes an alternating current supply section and a frequency modulation section. The alternating current supply section supplies two electrodes of the discharge lamp with an alternating current. The alternating current comprises a plurality of modulation periods. The frequency modulation section modulates a frequency of the alternating current so as to provide a plurality of retentive periods within each of the modulation periods. Each retentive period has a constant frequency that is different from a frequency of its temporally adjacent retentive periods. The frequency modulation section shortens a length of at least one of the retentive periods in the modulation period in response to a predetermined condition occurring. The frequency of at least one of the retentive periods is equal to or less than a predetermined reference frequency.

14 Claims, 15 Drawing Sheets

FIG. 5A  ANODE PERIOD OF PRIMARY MIRROR SIDE ELECTRODE
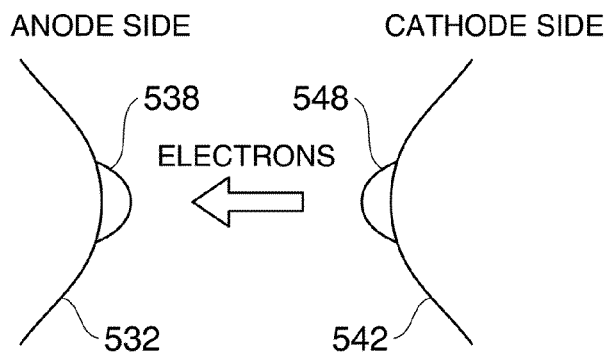
FIG. 5B  LOW FREQUENCY DRIVING
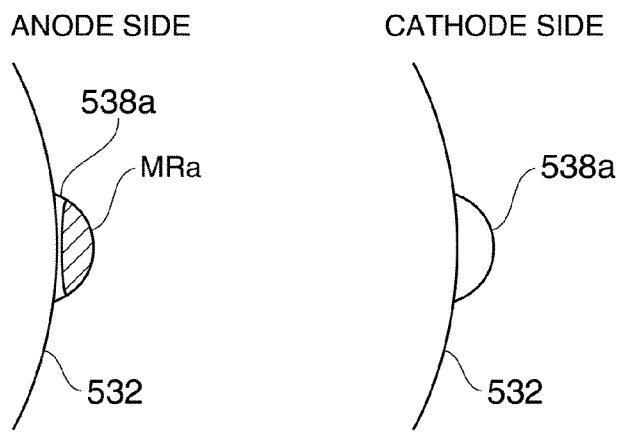
FIG. 5C  HIGH FREQUENCY DRIVING
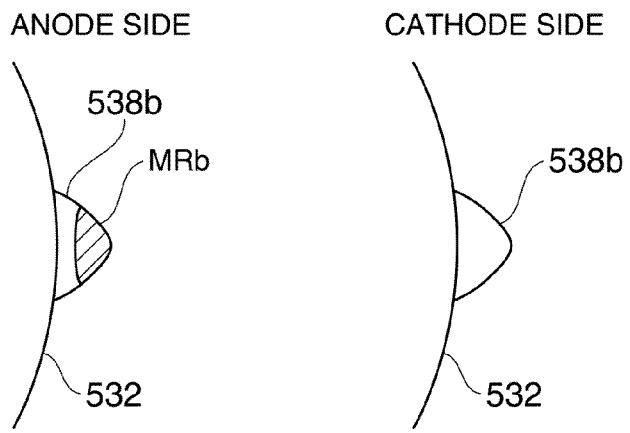

FIG. 6A  BEGINNING OF LOW FREQUENCY DRIVING
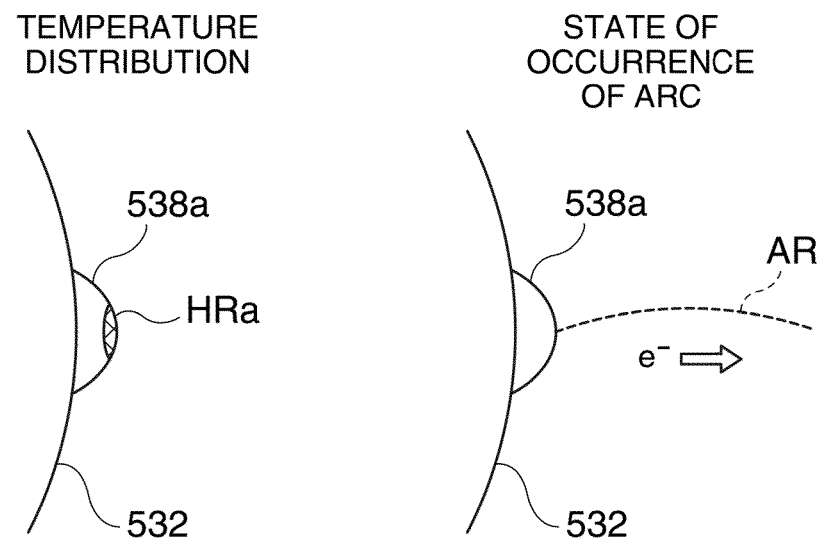
FIG. 6B  DURING LOW FREQUENCY DRIVING
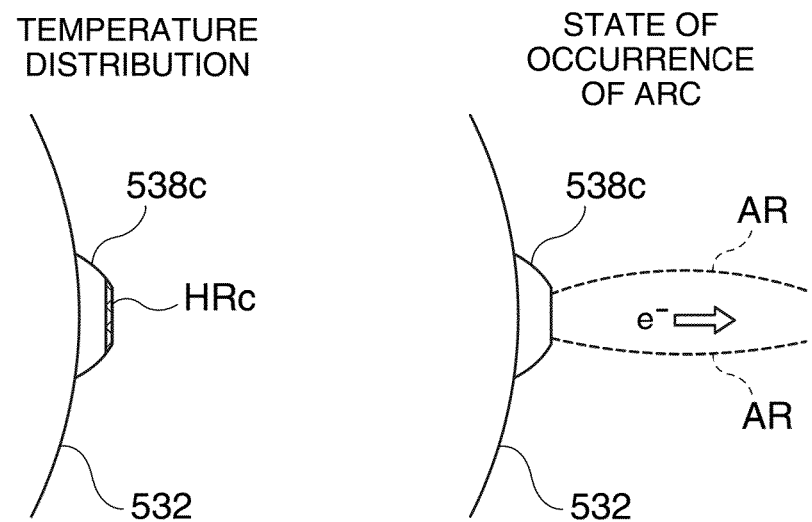

FIG. 14A  BEGINNING OF LOW FREQUENCY DRIVING
(LOW POWER DRIVING MODE)
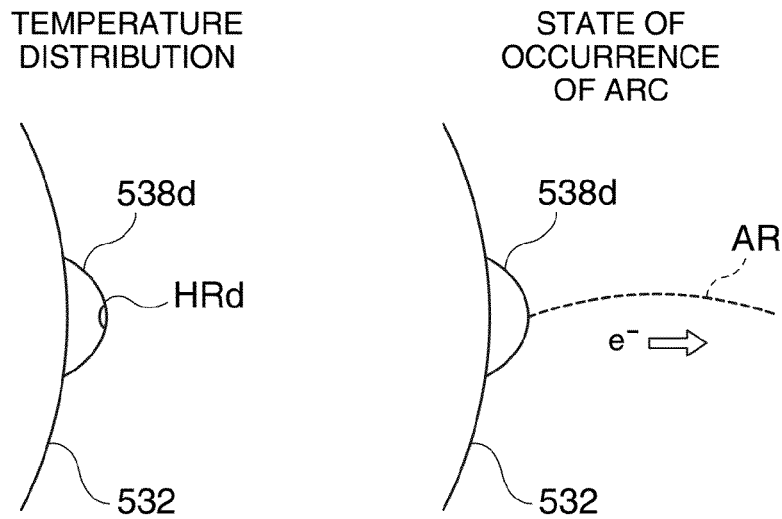
FIG. 14B  DURING LOW FREQUENCY DRIVING
(LOW POWER DRIVING MODE)
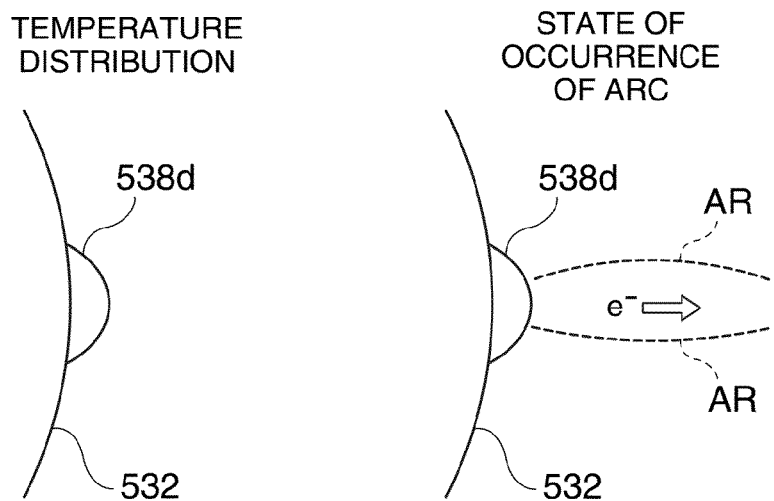

DRIVING METHOD FOR DISCHARGE LAMP, DRIVING DEVICE FOR DISCHARGE LAMP, LIGHT SOURCE DEVICE, AND IMAGE DISPLAY APPARATUS

CROSS-REFERENCE

The present application claims priority from Japanese Patent Application No. 2008-310805 filed on Dec. 5, 2008 and Japanese Patent Application No. 2009-134872 filed on Jun. 4, 2009, each of which is hereby incorporated by reference in its entirety.

BACKGROUND

Discharge lamps such as super-high pressure discharge lamps may be used as a light source in image display apparatuses such as projectors. In such a super high-pressure discharge lamp, the arc used as a luminescent spot is formed between projections provided to the electrodes. Therefore, it has been proposed that the projections are formed on the tips of the electrodes, and in order for forming the arc originated from the projections, an alternating current having a signal with a frequency lower than a stationary frequency inserted in a signal with the stationary frequency is supplied to the super-high pressure discharge lamp (see, e.g., Japan Patent Publication No. JP-A-2006-59790).

However, even if an alternating current having a signal with a lower frequency inserted is supplied to the discharge lamp, projections with preferable shapes may not be formed depending on the conditions of the electrodes, and flicker caused by migration of the bright spot of the arc might occur.

SUMMARY

Various embodiments of the disclosure make it possible to more reliably prevent the flickers from occurring.

In certain embodiments, there is provided a driving device for a discharge lamp including an alternating current supply section adapted to supply an alternating current between two electrodes of the discharge lamp, and a frequency modulation section adapted to modulate a frequency of the alternating current by providing a plurality of periods with frequencies of the alternating current different from each other within a period of modulation, and the frequency modulation section makes at least one period of the plurality of periods with the frequency one of equal to and lower than a predetermined reference frequency shorter than before a predetermined condition is satisfied in response to the predetermined condition being satisfied.

When keeping the state in which the frequency of the alternating current is set to be low, the possibility of occurrence of the flicker becomes high. Since in this aspect, the time period during which the discharge lamp is driven at low frequency can be shortened by shortening at least one period with the frequency equal to or lower than the reference frequency, it becomes possible to prevent the flicker from occurring.

According to another aspect, the frequency modulation section, in performing the shortening, shortens a length of a first period included in the plurality of periods and having the frequency corresponding to a first frequency to be shorter than a length of a second period included in the plurality of periods and having the frequency corresponding to a second frequency higher than the first frequency.

In general, when the frequency of the alternating current is set to be high, the tip of the electrode extends toward the electrode opposed thereto, and thus the electrode is deformed to have a shape suitable for preventing the flicker. According to this aspect, since the second period with the higher frequency can be made longer than the first period with the lower frequency, it becomes possible to deform the electrode to have the shape suitable for preventing the flicker.

According to another aspect, the frequency modulation section, in performing the shortening, shortens the period in accordance with the frequency of the period so that the lower the frequency is, the shorter the period becomes.

According to this aspect, since the period with the higher frequency can be set to be longer, it becomes easier to deform the electrode to have a shape suitable for preventing the flicker.

According to another aspect, the frequency modulation section shortens each of the plurality of periods in response to the predetermined condition being satisfied.

According also to this aspect, since the period with the frequency equal to or lower than the reference frequency can be shortened, it becomes possible to prevent the flicker from occurring.

According to another aspect, there is further provided a flicker detection section adapted to detect occurrence of a flicker in the discharge lamp as a criterion of the predetermined condition, and the frequency modulation section performs the shortening upon detection of the flicker in the period with the frequency equal to or lower than the reference frequency.

According to this aspect, since the period with the frequency at which the flicker occurs actually can be shortened, it becomes possible to more reliably prevent the flicker.

According to another aspect, the frequency modulation section determines, after predetermined time has elapsed since the shortening, whether or not the flicker occurs at the frequency at which the flicker has been detected, and restores the period shortened once to have a length the shortened period had before shortening upon occurrence of no flicker.

If the shortened length of the period is restored before sufficient period of time has elapsed since the shortening, modification of the shape of the electrode is not sufficient, and there is a high possibility of reoccurrence of the flicker. Therefore, since it is possible to sufficiently modify the shape of the electrode by determining whether or not the restoration should be performed after the predetermined time has elapsed, it becomes possible to prevent the reoccurrence of the flicker.

According to another aspect, the predetermined condition is determined based on a deterioration state of the discharge lamp, and the frequency modulation section performs the shortening in response to determination that deterioration of the discharge lamp is in progress.

In general, when the deterioration of the discharge lamp is advanced, the electrodes are consumed, which makes the flicker be apt to occur. According to this aspect, in the case in which the deterioration of the discharge lamp, which thus makes the flicker be apt to occur, is advanced, by shortening at least one period with the frequency equal to or lower than the reference frequency, the flicker can more reliably be prevented from occurring.

According to another aspect, there is further provided with a lighting time accumulation section adapted to calculate accumulated lighting time from beginning of use of the discharge lamp as a parameter representing the deterioration state, and the frequency modulation section performs the shortening in response to the accumulated lighting time exceeding a predetermined upper time limit.

According to this aspect, it becomes possible to more easily determine the deterioration state of the discharge lamp.

According to another aspect, the alternating current supply section is configured to be able to modify power of the alternating current to be supplied to the discharge lamp, and the frequency modulation section performs the shortening in response to the power of the alternating current to be supplied to the discharge lamp being lower than predetermined reference power.

In general, since when the discharge lamp is driven with low power, the temperature of the electrode decreases, the possibility of occurrence of the flicker rises due to the continuous low frequency driving. According to this aspect, since the time period during which the discharge lamp is driven with the low frequencies can be made shorter in the case in which the power of the alternating current supplied to the discharge lamp is lower than the predetermined reference power, even in the case in which the discharge lamp is driven with the low power, the flicker can be prevented from occurring.

According to another aspect, there is provided a driving device for a discharge lamp including an alternating current supply section adapted to supply an alternating current between two electrodes of the discharge lamp, and a frequency modulation section adapted to modulate a frequency of the alternating current by providing a plurality of periods with frequencies of the alternating current different from each other within a period of modulation, and the frequency modulation section makes at least one period of the plurality of periods with the frequency exceeding a predetermined reference frequency longer than before a predetermined condition is satisfied in response to the predetermined condition being satisfied.

In the case in which the frequency of the alternating current is high, there is a tendency that a minute projection with a low thermal capacity is provided at the tip portion of the electrode. Further, in the case in which the fusibility of the electrode becomes deteriorated, the projection with a planarized tip is provided at the tip portion of the electrode when supplying the alternating current with a low frequency, and such a projection is not sufficiently melted because of a high thermal capacity thereof. As such, unevenness may be formed on the surface of the projection and the possibility of the occurrence of flicker rises. According to this aspect, when the predetermined condition is satisfied, the minute projection is provided at the tip portion of the electrode to reduce the thermal capacity of the projection by elongating at least one period with the frequency exceeding the reference frequency, thus the fusibility of the projection can be enhanced. Thus, it is possible to prevent the occurrence of the flicker.

It should be noted that the disclosure can be put into practice in various forms. The disclosure may be put into practice in the forms of, for example, a driving device and a driving method for a discharge lamp, a light source device using a discharge lamp and a control method thereof, and an image display apparatus using the light source device.

BRIEF DESCRIPTION OF THE DRAWINGS

Non-limiting and non-exhaustive embodiments of the present disclosure will now be described with reference to the accompanying drawings, wherein like numbers reference like elements.

FIGS. 5A, 5B, and 5C are explanatory diagrams illustrating how a shape of a primary mirror side electrode varies when driving the discharge lamp at different drive frequencies.

FIGS. 6A and 6B are explanatory diagrams illustrating an influence exerted by passage of time on a generation state of the arc in a low frequency driving mode.

FIGS. 14A and 14B are explanatory diagrams illustrating how the arc occurs when the low frequency drive is continued in a low power driving mode.

DESCRIPTION OF EMBODIMENTS

In the following description, reference is made to the accompanying drawings which form a part hereof, and in which are shown, by way of illustration, specific embodiments in which the disclosure may be practiced. It is to be understood that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may. Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

A1. Configuration of Projector

Figure 1:
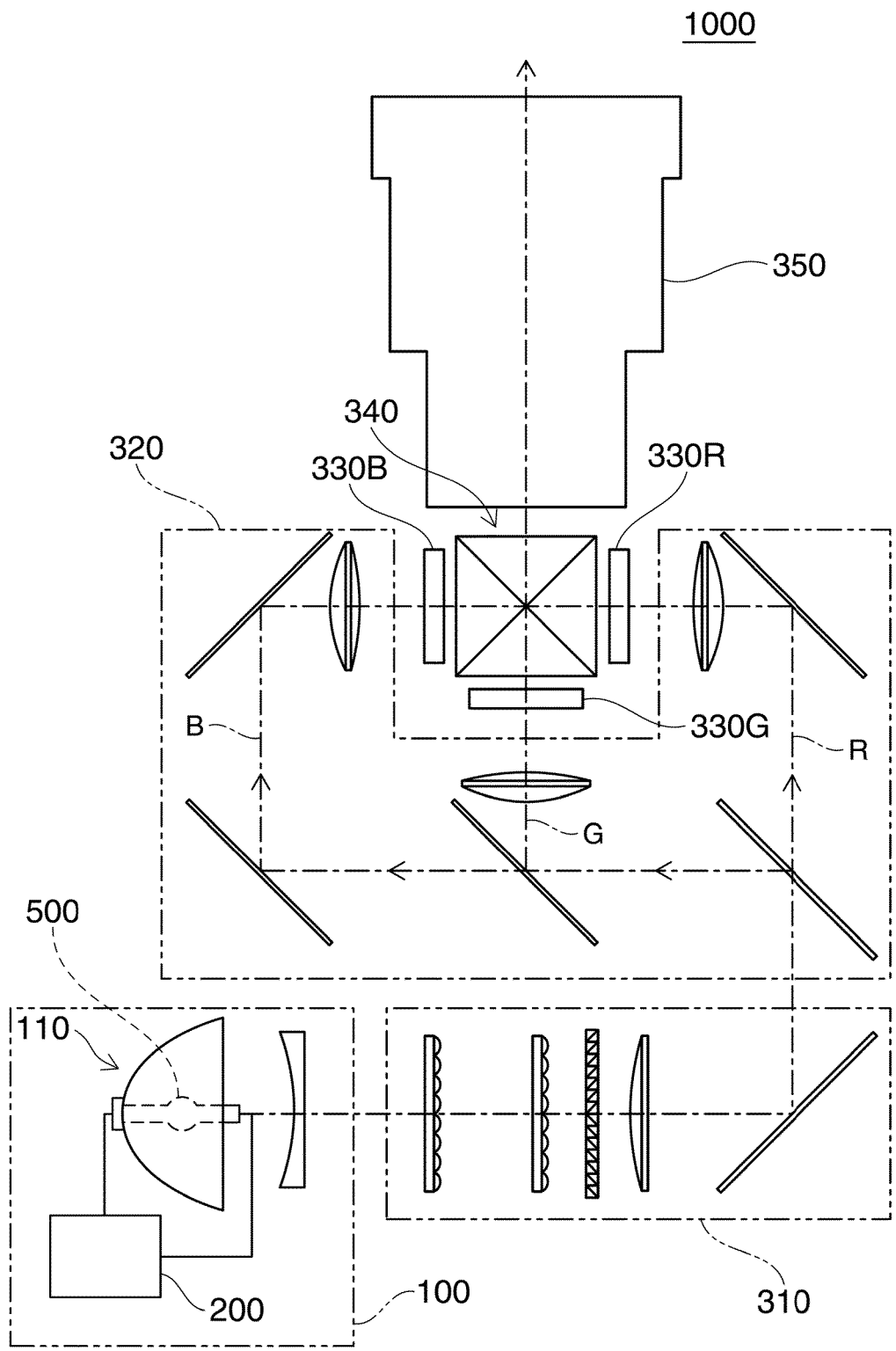
FIG. 1 is a schematic configuration diagram of a projector.

FIG. 1 is a schematic configuration diagram of a projector 1000 to which a first embodiment is applied. The projector 1000 includes a light source device 100, an illumination optical system 310, a color separation optical system 320, three liquid crystal light valves 330R, 330G, 330B, a cross dichroic prism 340, and a projection optical system 350.

The light source device 100 has a light source unit 110 attached with a discharge lamp 500, and a discharge lamp driving device 200 for driving the discharge lamp 500. The discharge lamp 500 is supplied with electric power by the discharge lamp driving device 200 to emit light. The light source unit 110 emits the light, which is emitted from the discharge lamp 500, toward the illumination optical system 310. It should be noted that specific configurations and specific functions of the light source unit 110 and the discharge lamp driving device 200 will be described later.

The illumination optical system 310 uniformizes the illuminance of the light emitted from the light source unit 110, and at the same time aligns the polarization direction thereof to one direction. The light with the illuminance uniformized through the illumination optical system 310 and with the polarization direction aligned therethrough is separated into three colored light beams of red (R), green (G), and blue (B) by the color separation optical system 320. The three colored light beams thus separated by the color separation optical system 320 are modulated by the respective liquid crystal light valves 330R, 330G, 330B. The three colored light beams respectively modulated by the liquid crystal light valves 330R, 330G, 330B are then combined by the cross dichroic prism 340, and enter the projection optical system 350. By the projection optical system 350 projecting the light beams, which have entered, on a screen not shown, an image is displayed on the screen as a full color picture obtained by combining the images respectively modulated by the liquid crystal light valves 330R, 330G, 330B. It should be noted that although in the first embodiment, the three liquid crystal light valves 330R, 330G, 330B individually modulate the respective three colored light beams, it is also possible to assume that a single liquid crystal light valve provided with a color filter modulates the light beam. In this case, it becomes possible to eliminate the color separation optical system 320 and the cross dichroic prism 340.

A2. Configuration of Light Source Device

Figure 2:
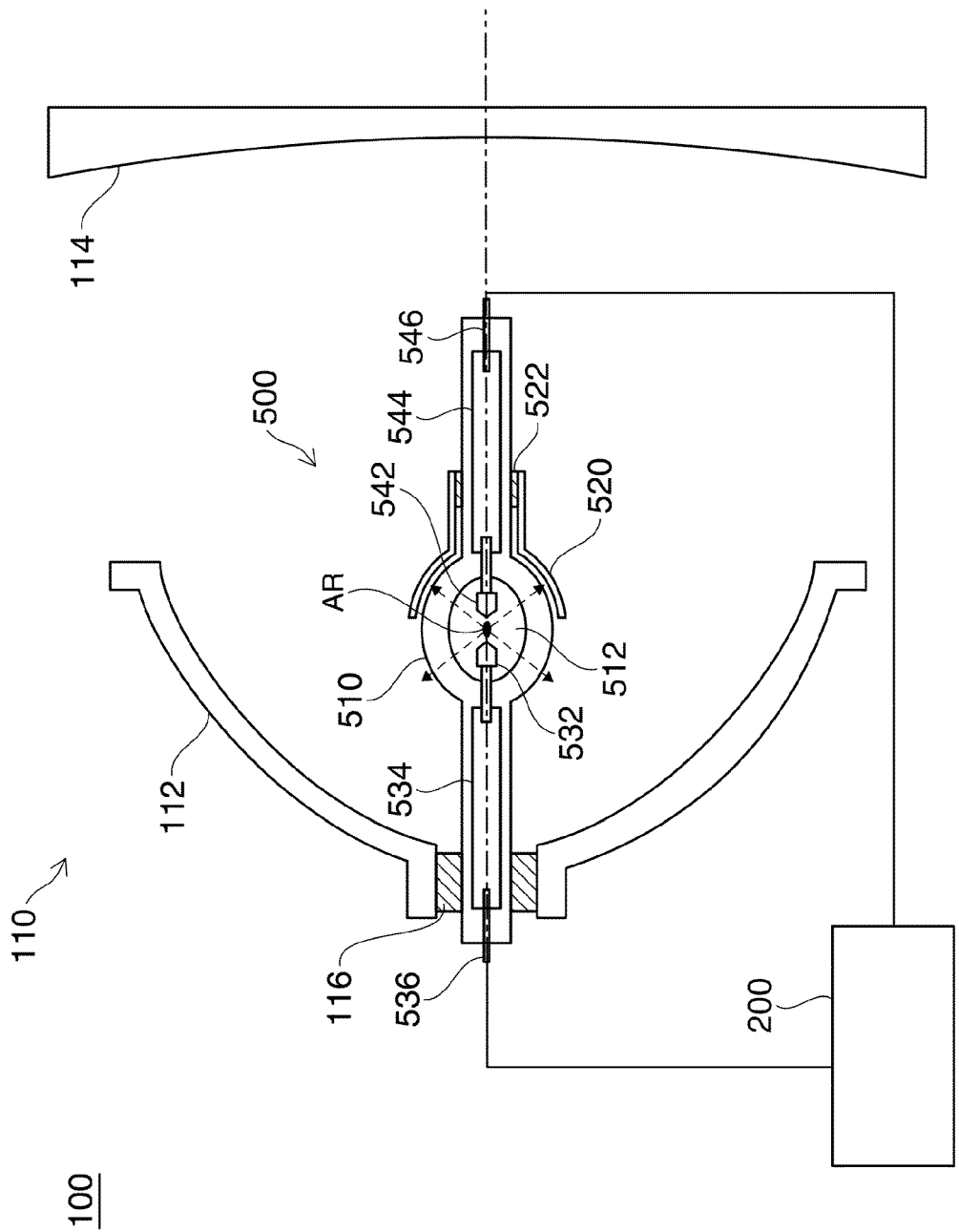
FIG. 2 is an explanatory diagram illustrating a configuration of a light source device.

FIG. 2 is an explanatory diagram showing a configuration of the light source device 100. As described above, the light source device 100 is provided with the light source unit 110 and the discharge lamp driving device 200. The light source unit 110 is provided with the discharge lamp 500, a primary reflecting mirror 112 having a spheroidal reflecting surface, and a collimating lens 114 for obtaining an approximately collimated light beam as the light beam emitted therefrom. It should be noted that the reflecting surface of the primary reflecting mirror 112 is not necessarily required to have a spheroidal shape. For example, the reflecting surface of the primary reflecting mirror 112 can have a paraboloidal shape. In this case, by placing the light emitting section of the discharge lamp 500 at a so-called focal point of the paraboloidal mirror, the collimating lens 114 can be eliminated. The primary reflecting mirror 112 and the discharge lamp 500 are bonded to each other with an inorganic adhesive 116.

The discharge lamp 500 is formed by bonding a discharge lamp main body 510 and a secondary reflecting mirror 520 having a spherical reflecting surface to each other with an inorganic adhesive 522. The discharge lamp main body 510 is formed from, for example, a glass material such as quartz glass. The discharge lamp main body 510 is provided with two electrodes 532, 542 formed from a high-melting point electrode material such as tungsten, two connection members 534, 544, and two electrode terminals 536, 546. The electrodes 532, 542 are disposed so that the tip portions thereof are opposed to each other in a discharge space 512 formed at the central part of the discharge lamp main body 510. In the discharge space 512, there is encapsulated a gas including a noble gas, mercury or a metallic halide, and so on as a discharge medium. The connection members 534, 544 are members for electrically connecting the electrodes 532, 542 and the electrode terminals 536, 546 to each other, respectively.

The electrode terminals 536, 546 of the discharge lamp 500 are separately connected to the discharge lamp driving device 200. The discharge lamp driving device 200 supplies the electrode terminals 536, 546 with a pulsed alternating current (an alternating pulse current). When the alternating pulse current is supplied to the electrode terminals 536, 546, an arc AR occurs between the tip portions of the two electrodes 532, 542 disposed in the discharge space 512. The arc AR emits light in all directions from the point where the arc AR occurs. The secondary reflecting mirror 520 reflects the light, which is emitted toward the electrode 542, namely one of the electrodes 532, 542, toward the primary reflecting mirror 112. By thus reflecting the light, which is emitted toward the electrode 542, toward the primary reflecting mirror 112, a higher degree of parallelization of the light emitted from the light source unit 110 can be obtained. It should be noted that the electrode 542 on the side where the secondary reflecting mirror 520 is disposed is referred to also as a "secondary mirror side electrode 542," and the other electrode 532 is referred to also as a "primary mirror side electrode 532."

Figure 3:
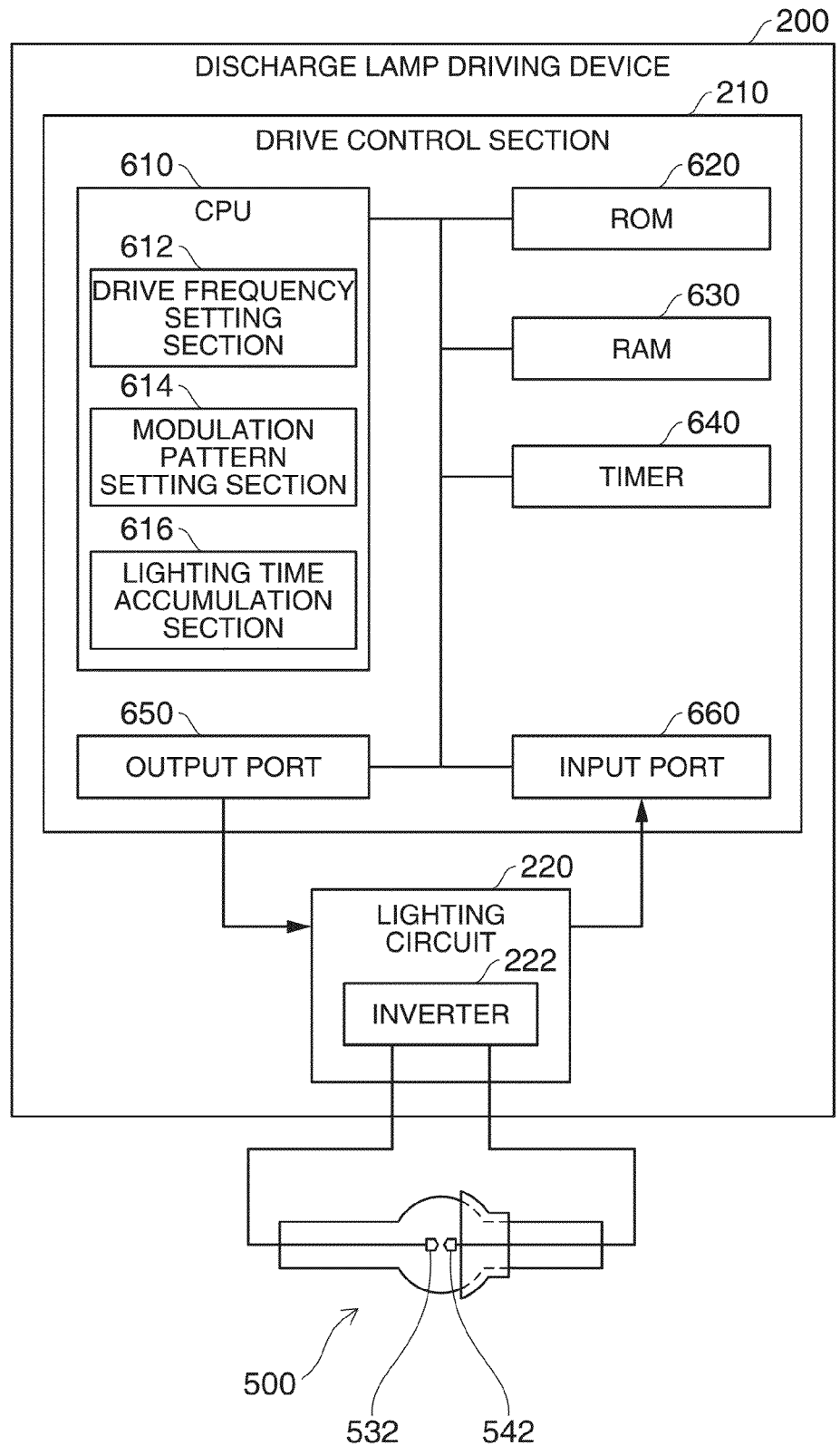
FIG. 3 is a block diagram illustrating a configuration of a discharge lamp driving device.

FIG. 3 is a block diagram showing a configuration of the discharge lamp driving device 200. The discharge lamp driving device 200 has a drive control section 210 and a lighting circuit 220. The drive control section 210 is configured as a computer provided with a CPU 610, a ROM 620, a RAM 630, a timer 640, an output port 650 for outputting a control signal to the lighting circuit 220, and an input port 660 for acquiring a signal from the lighting circuit 220. The CPU 610 of the drive control section 210 executes a program stored in the ROM 620 based on output signals from the timer 640 and the input port 660. Thus, the CPU 610 realizes functions as a drive frequency setting section 612, a modulation pattern setting section 614, and a lighting time accumulation section 616.

The lighting circuit 220 has an inverter 222 for generating an alternating pulse current. The lighting circuit 220 controls the inverter 222 based on the control signal supplied from the drive control section 210 via the output port 650. Specifically, the lighting circuit 220 makes the inverter 222 generate the alternating pulse current corresponding to feed conditions (e.g., a frequency and a pulse waveform of the alternating pulse current) designated by the control signal. The inverter 222 generates the alternating pulse current with constant power (e.g., 200 W) to be supplied to the discharge lamp 500 in accordance with the feed conditions designated by the lighting circuit 220, and supplies the discharge lamp 500 with the alternating pulse current thus generated.

The lighting time accumulation section 616 accumulates the lighting time (accumulated lighting time) of the discharge lamp 500 from the beginning of the use of the discharge lamp 500. Specifically, when the power is applied to the discharge lamp driving device 200, the accumulated lighting time at the time when the power has been cut previously is obtained from a rewritable area of the ROM 620 or a nonvolatile area of the RAM 630. Then, the accumulated lighting time is calculated based on an interval signal supplied from the timer 640 during the period in which the discharge lamp 500 is lighted, and the accumulated lighting time thus calculated when the power of the discharge lamp driving device 200 is cut is stored into the ROM 620 or the RAM 630.

The drive frequency setting section 612 of the drive control section 210 sets the frequency (the drive frequency) of the alternating pulse current, which the lighting circuit 220 outputs, in accordance with the modulation pattern set by the modulation pattern setting section 614. As described above, the drive frequency is realized by the functions of the drive frequency setting section 612 and the modulation pattern setting section 614. Therefore, the drive frequency setting section 612 and the modulation pattern setting section 614 can collectively be called a "drive frequency modulation section" or simply a "frequency modulation section." The modulation pattern setting section 614 modifies the modulation pattern to be set, based on the accumulated lighting time of the discharge lamp 500 calculated by the lighting time accumulation section 616. It should be noted that the specific content of the modification of the modulation pattern based on the accumulated lighting time will be described later.

A3. Drive Frequency Modulation for Discharge Lamp

Figure 4A:
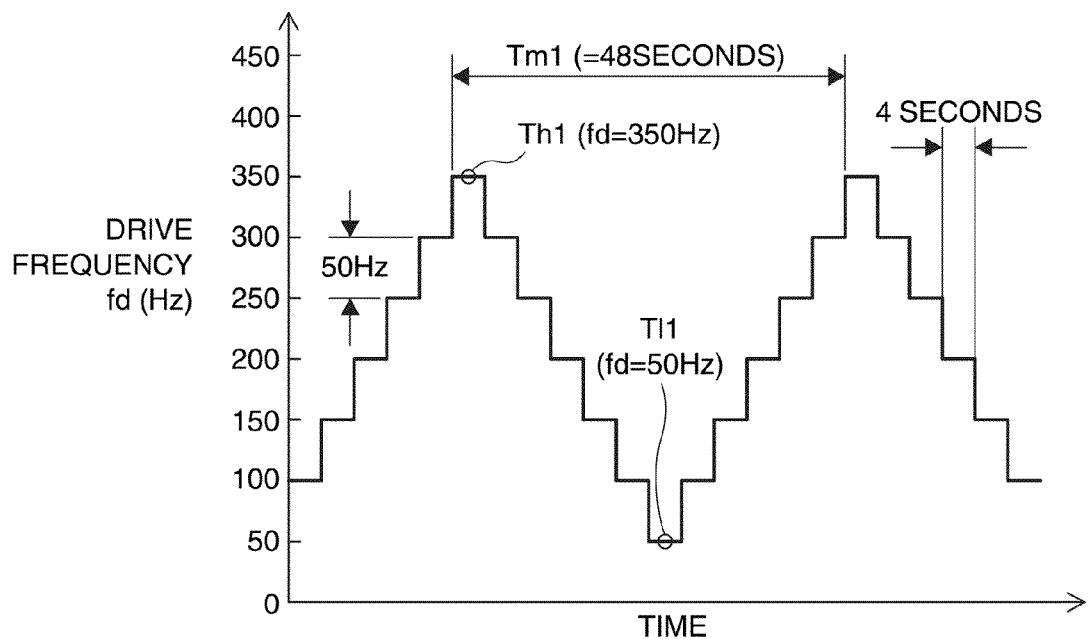
FIGS. 4A and 4B are explanatory diagrams illustrating an example of a modulation pattern of a drive frequency.
Figure 4B:
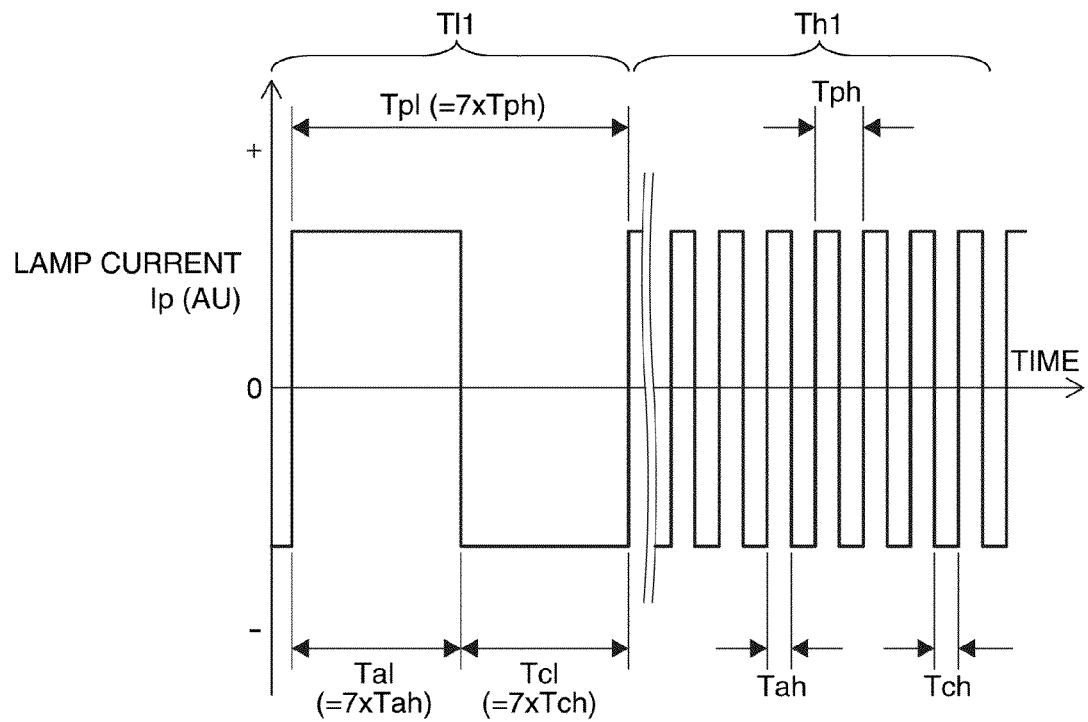

FIGS. 4A and 4B are explanatory diagrams showing an example of a modulation pattern of the drive frequency fd to be set by the modulation pattern setting section 614. FIG. 4A is a graph showing a time variation of the drive frequency fd. In the modulation pattern shown in FIG. 4A, the drive frequency fd is modulated by varying the drive frequency fd by 50 Hz every 4 seconds. Since there are provided 12 periods (retentive periods) during which the drive frequency fd is retained at a constant value, the period (the modulation period) Tm1 of the modulation of the drive frequency fd is set to be 48 seconds, and the drive frequency fd of the period (the highest frequency period) Th1 with the highest value of the drive frequency fd is set to be 350 Hz, and the drive frequency fd of the period (the lowest frequency period) Tl1 with the lowest value of the drive frequency fd is set to be 50 Hz.

FIG. 4B shows the time variation of a current (a lamp current) Ip supplied to the discharge lamp 500 in each of the lowest frequency period Tl1 and the highest frequency period Th1 of the modulation pattern shown in FIG. 4A. In FIG. 4B, the positive direction of the lamp current Ip represents the direction of the current flowing from the primary mirror side electrode 532 toward the secondary mirror side electrode 542. Specifically, the primary mirror side electrode 532 acts as an anode in periods Tal, Tah in which the lamp current Ip takes a positive value, while in periods Tcl, Tch in which the lamp current Ip takes a negative value, the primary mirror side electrode 532 acts as a cathode. It should be noted that hereinafter the period in which one of the electrodes acts as an anode is also referred to as an "anode period" of that electrode, and the period in which one of the electrodes acts as a cathode is also referred to as a "cathode period" of that electrode.

As shown in FIG. 4A, the drive frequency fd (350 Hz) in the highest frequency period Th1 is set to be 7 times of the drive frequency fd (50 Hz) in the lowest frequency period Tl1. Therefore, as shown in FIG. 4B, a switching period Tpl with which the polarity of the lamp current Ip is switched in the lowest frequency period Tl1 is set to be 7 times as long as the switching period Tph in the highest frequency period Th1. Further, the anode period Tal and the cathode period Tcl of the primary mirror side electrode 532 in the lowest frequency period Tl1 are set to be 7 times as long as the anode period Tah and the cathode period Tch thereof in the highest frequency period Th1, respectively.

In the first embodiment, a rectangular wave is used as the waveform of the lamp current Ip. By thus forming the lamp current Ip as the rectangular wave, the absolute value of the lamp current Ip is kept constant. Therefore, it is prevented that the emitted light intensity of the discharge lamp 500 is varied temporally due to the variation of the lamp current Ip. By preventing the temporal variation of the emitted light intensity, it is possible to prevent occurrence of a phenomenon (scroll noise) that bright and dark fringes appear on the display image.

Further, as shown in FIG. 4B, in the first embodiment, an anode duty ratio of each of the primary mirror side electrode 532 and the secondary mirror side electrode 542 is set to be 50%. Here, the anode duty ratio of the primary mirror side electrode 532 denotes the ratio in length of the anode period Tal (Tah) of the primary mirror side electrode 532 with respect to the switching period Tpl (Tph). Further, the anode duty ratio of the secondary mirror side electrode 542 denotes the ratio in length of the anode period of the secondary mirror side electrode 542, namely the cathode period Tcl (Tch) of the primary mirror side electrode 532, with respect to the switching period Tpl (Tph). It is not necessarily required to set the anode duty ratios of the both electrodes 532, 542 to be the same. For example, in the case of using the discharge lamp 500 having the secondary reflecting mirror 520 as shown in FIG. 2, it is also possible to set the anode duty ratio of the secondary mirror side electrode 542 to be lower than 50%, namely the anode duty ratio of the primary mirror side electrode 532 to be higher than 50%, in consideration of the fact that the heat radiation from the secondary mirror side electrode 542 becomes difficult. As described later, since the heat generation in an electrode occurs during the anode period of the electrode, the value of the heat generated in one of the electrodes increases as the anode duty ratio of the electrode rises. Therefore, from the viewpoint of the possibility of preventing the excessive temperature rise of the secondary mirror side electrode 542, the anode duty ratio of the secondary mirror side electrode 542, which has difficulty in heat radiation therefrom, may be set be lower than 50%.

FIGS. 5A, 5B, and 5C are explanatory diagrams showing how the shape of the primary mirror side electrode 532 varies when driving the discharge lamp 500 with different drive frequencies fd as shown in FIG. 4A. As shown in FIG. 5A, the electrodes 532, 542 are respectively provided with projections 538, 548 toward the opposed electrode. FIG. 5B shows the state of the primary mirror side electrode 532 in the case in which the drive frequency fd is low. FIG. 5C shows the state of the primary mirror side electrode 532 in the case in which the drive frequency fd is high.

FIG. 5A shows the states of the two electrodes 532, 542 in the anode period of the primary mirror side electrode 532. As shown in FIG. 5A, in the anode period of the primary mirror side electrode 532, electrons are emitted from the secondary mirror side electrode 542 and then collide against the primary mirror side electrode 532. In the primary mirror side electrode 532 acting as the anode, since the kinetic energy of the electrons having collided is converted into heat energy, the temperature rises. In contrast, in the secondary mirror side electrode 542 acting as the cathode, since no collision of the electrons occurs, the temperature decreases due to heat conduction and heat radiation. In the similar manner, in the anode period (i.e., the cathode period of the primary mirror side electrode 532) of the secondary mirror side electrode 542, the temperature of the secondary mirror side electrode 542 rises, while the temperature of the primary mirror side electrode 532 decreases.

In the anode period of the primary mirror side electrode 532, since the temperature of the primary mirror side electrode 532 rises, a melted portion where the electrode material is melted is caused in the projection 538 of the primary mirror side electrode 532. Subsequently, when the cathode period of the primary mirror side electrode 532 comes, the temperature of the primary mirror side electrode 532 decreases, and solidification of the melted portion caused in the tip portion of the projection 538 begins. By the melted portion thus appearing in each of the projections 538, 548 and then being solidified, the projections 538, 548 are maintained to have the shape convex toward the opposed electrode.

FIGS. 5B and 5C show an influence the drive frequency fd exerts on the shapes of the projections. When the drive frequency fd is low, temperature rise occurs in a large area of the projection 538a of the primary mirror side electrode 532 in the anode state. Further, when the drive frequency fd is low, the force applied to the melted portion MRa due to the potential difference from the secondary mirror side electrode 542 opposed thereto is also applied to a large area of the melted section MRa. Therefore, as shown in FIG. 5B, a flat melted portion MRa is formed in the projection 538 of the primary mirror side electrode 532 in the anode state. Then, when the primary mirror side electrode 532 is switched to the cathode state, the melted portion MRa is solidified to form the projection 538a with a flat shape.

In contrast, when the drive frequency fd is high, the range where the temperature rise occurs in the projection 538b of the primary mirror side electrode 532 in the anode state is reduced, and thus the melted portion MRb smaller than in the case with the lower drive frequency fd is provided to the projection 538b. Further, the force applied to the melted portion MRb of the projection 538b is concentrated to the center of the melted portion MRb. Therefore, as shown in FIG. 5C, the melted portion MRb provided to the projection 538 is tapered toward the secondary mirror side electrode 542 opposed thereto, and therefore, the shape of the projection 538b obtained by solidifying the melted portion MRb in the cathode period also becomes tapered.

As described above, in the case in which the drive frequency fd is low, since the projection 538a is sufficiently melted, the projection 538a becomes large. In contrast, in the case in which the drive frequency fd is high, extension of the projection 538b toward the opposed electrode is promoted. Therefore, by modulating the drive frequency fd, the projection 538a becomes large in the low frequency driving mode with the lower drive frequency fd, and the projection 538b extends in the high frequency driving mode with the higher drive frequency fd. Thus, the distance between the electrodes 532, 542 can be prevented from increasing, and the voltage between the electrodes 532, 542 can be prevented from rising when supplying the discharge lamp 500 with the alternating pulse current of constant power.

Further, as shown in FIG. 4A, the drive frequency fd varies stepwise from 50 Hz in the lowest frequency period Tl1 to 350 Hz in the highest frequency period Th1. Therefore, since the projection 538a, which has once become larger, sequentially changes to have the tapered shape, the projection with a shape such as a conical shape suitable for stabilizing the position at which the arc occurs can be formed. It should be noted that in the case in which the frequency is sequentially varied along the modulation pattern shown in FIG. 4A, since the phenomenon in the case in which the drive frequency fd is high and the phenomenon in the case of the low drive frequency are repeated continuously, it looks to the eye that the projections 538, 548 on the tips of the electrodes 532, 542 are kept to have shapes suitable for stabilizing the position at which the arc occurs, such as a conical shape, and it is difficult to observe the actual state in which the projection 538a becomes large in the low frequency driving mode and the projection 538b extends in the high frequency driving mode.

It should be noted that since the shape of the projection 538b is becoming tapered in the high frequency driving mode, there is a possibility that miniaturization of the projection 538b is advanced to form a minute projection. If the minute projection is formed, there might be caused a flicker (arc-jump) in which the position of occurrence of the arc migrates due to deformation of the minute projection or pluralization of the minute projection. However, in the first embodiment, the minute projection disappears in the low frequency driving mode by modulating the drive frequency fd. Therefore, the flicker caused by the formation of the minute projection may be eliminated. On the other hand, in the low frequency driving mode, since the shape of the projection 538a becomes planarized, the possibility of generating the flicker rises over time. FIGS. 6A and 6B are explanatory diagrams showing an influence exerted during a passage of time on a generation state of the arc in the low frequency driving mode.

FIG. 6A shows the generation state of the arc AR at the time point (beginning of the low frequency driving mode) when the drive frequency fd is switched from the high state to the low state. FIG. 6B shows the generation state of the arc AR at the time point (during the low frequency driving mode) when a predetermined time has elapsed from the beginning of the low frequency driving mode.

As described above, in the case when the drive frequency fd is high, the area of the projection 538b in the anode state the temperature of which rises becomes small, and the projection 538b with a tapered shape is formed. Therefore, as shown in FIG. 6A, at the beginning of the low frequency driving mode, the high temperature area HRa (a hot spot) is formed at the tip of the projection, and the projection 538a extends towards the side of the secondary mirror side electrode 542 (FIG. 6A) opposed thereto. The arc AR occurs from a position at which the electron e⁻ is emitted in the cathode period of the electrode 532. The higher the temperature is, and the stronger the electric field is, the more easily the electron e⁻ is emitted from the cathode. Therefore, as shown in FIG. 6A, the electron e⁻ is emitted from the tip of the projection 538a, and the arc AR occurs from the tip of the projection 538a.

In contrast, in the low frequency driving mode, the area the temperature of which rises extends, as described above. Therefore, as shown in FIG. 6E, the hot spot HRc extends during the low frequency driving mode. Further, since the projection 538c is flattened due to the low frequency driving, the tip of the projection 538c is flattened. As described above, since the hot spot HRc extends, and the tip of the projection 538c is flattened, the positions from which the electron e⁻ is easily emitted become distributed in a large area. Therefore, the arc AR occurs from a random position of the projection 538c thus planarized during the low frequency driving mode, and the possibility of occurrence of the flicker rises.

Further, in the discharge lamp 500, the electrodes 532, 542 are consumed, and the tips thereof are planarized as the accumulated lighting time becomes longer. Therefore, if the period of the low frequency driving is set to be long in the condition in which the accumulated lighting time is long, the possibility of occurrence of the flicker rises. Therefore, in the first embodiment, in order for preventing the flicker from occurring, the modulation pattern of the drive frequency fd is modified in accordance with the accumulated lighting time.

A4. Modification of Modulation Pattern

Figure 7:
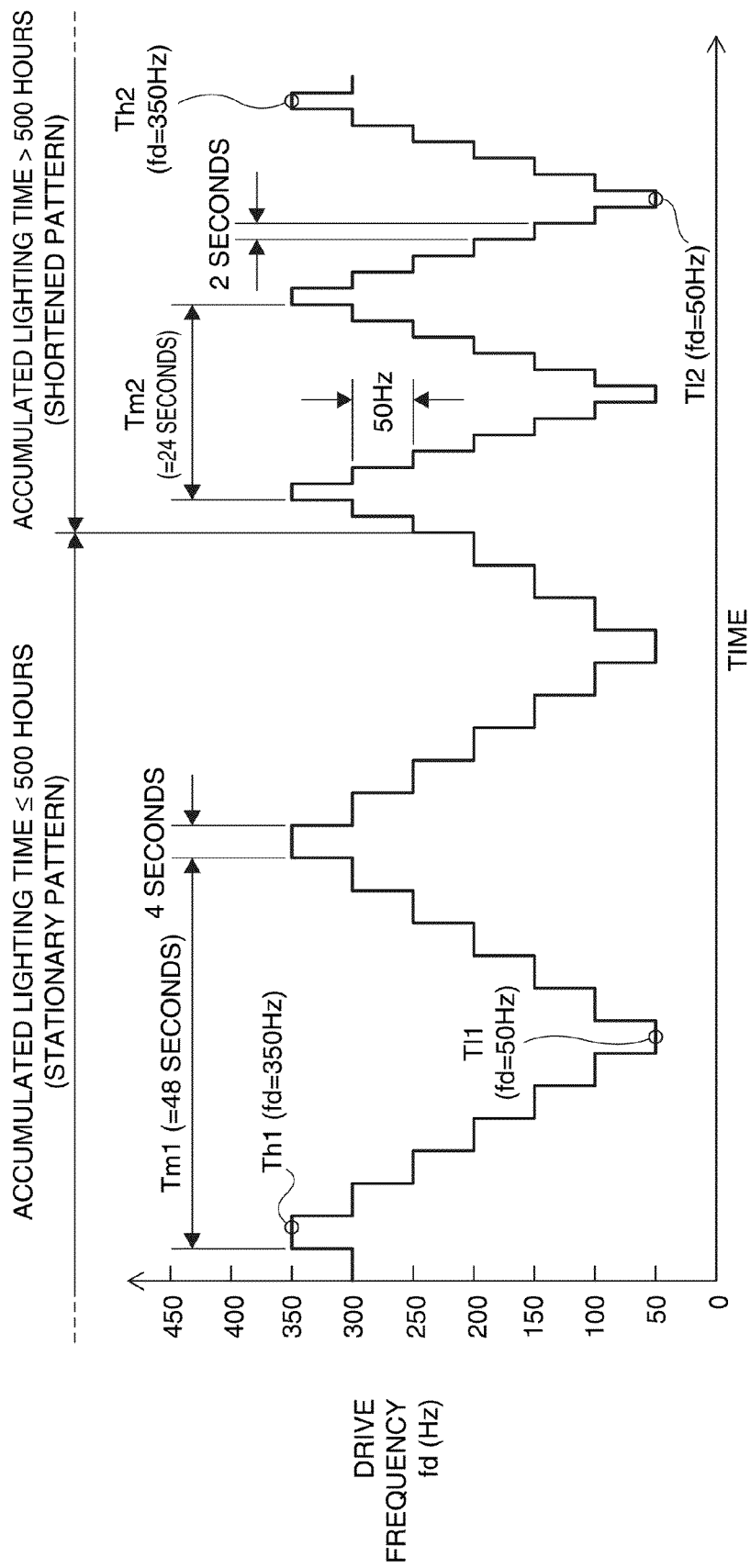
FIG. 7 is a diagram illustrating how the modulation pattern is modified in a first embodiment.

FIG. 7 is a diagram showing how the modulation pattern is modified in the first embodiment. It should be noted that the modification of the modulation pattern is realized as a function of the modulation pattern setting section 614. The modulation pattern setting section 614 (FIG. 3) can be arranged to select the modulation pattern to be set from a plurality of modulation patterns stored previously in the ROM 620, or to copy the modulation pattern, which is stored in the ROM 620, on the RAM 630, and then modify the modulation pattern thus copied.

The graph shown in FIG. 7 shows a time variation in the drive frequency fd around the time point at which the accumulated lighting time exceeds a predetermined amount of time (500 hours in the example shown in FIG. 7). As shown in FIG. 7, the modulation pattern of the drive frequency fd is modified before and after the time point at which the accumulated lighting time exceeds 500 hours. It should be noted that although in the example shown in FIG. 7, the modification of the modulation pattern is executed when the drive frequency fd is switched from 200 Hz to 250 Hz, it is possible to execute the modification of the modulation pattern at any point of time. It should be noted that the modulation pattern may be modified when the drive frequency fd is switched. As described above, in the first embodiment, since the modulation pattern is modified when the accumulated lighting time reaches the predetermined time, the time point with the accumulated lighting time equal to or shorter than the predetermined time is also described as "before modification," and the time point with the accumulated lighting time exceeding the predetermined time is also described as "after modification."

In FIG. 7, the modulation pattern before modification is the same as shown in FIG. 4A. Further, when the accumulated lighting time exceeds 500 hours, the length (step time) of the retentive period during which the drive frequency fd is retained constant is uniformly modified to be 2 seconds, which is a half as long as before modification, independently of the drive frequency fd. In the modulation pattern after modification, the drive frequencies fd (50 Hz and 350 Hz) in the lowest frequency period Tl2 and the highest frequency period Th2, and the variation step (50 Hz) of the drive frequency fd are the same as those of the modulation pattern before modification, respectively. Therefore, the modulation period Tm2 (24 seconds) in the modulation pattern after modification is arranged to be a half of the modulation period Tm1 (48 seconds) in the modulation pattern before modification. It should be noted that hereinafter the modulation pattern with a shortened retentive period like the modulation pattern after modification is also referred to as a "shortened pattern," and the modulation pattern before modification with a retentive period not shortened is also referred to as a "stationary pattern."

As described above, in the first embodiment, in the case in which the accumulated lighting time exceeds the predetermined time, it is arranged that the length of each of the retentive periods becomes shorter than the length of the retentive period before modification. Therefore, the period of time during which the low frequency driving is performed can be shortened, thus the flicker can be prevented from occurring. It should be noted that although in the first embodiment, the length of the retentive period after modification is set to be a half of the length of the retentive period before modification, in general, it is sufficient that the length becomes shorter than before modification. The extent to which the length of the retentive period after modification is shortened from that before modification is appropriately determined based on an experiment and so on.

Although in the first embodiment, the modification of the modulation pattern of the drive frequency fd is performed in accordance with the accumulated lighting time, in general, it is also possible to arrange that the modulation pattern is modified in accordance with the deterioration state of the discharge lamp 500 such as the state in which the electrodes 532, 542 are consumed. The deterioration state of the discharge lamp 500 can be detected based on the lamp voltage, reduction in the light intensity due to the evaporation of the electrode material on the inner wall of the discharge space 512 (FIG. 2), and so on, besides the accumulated lighting time. The lamp voltage can be detected by appropriately configuring the lighting circuit 220. Further, the reduction in the light intensity can be detected by providing a light receiving element in the light path of the light emitted from the discharge lamp 500.

B. Second Embodiment

Figure 8:
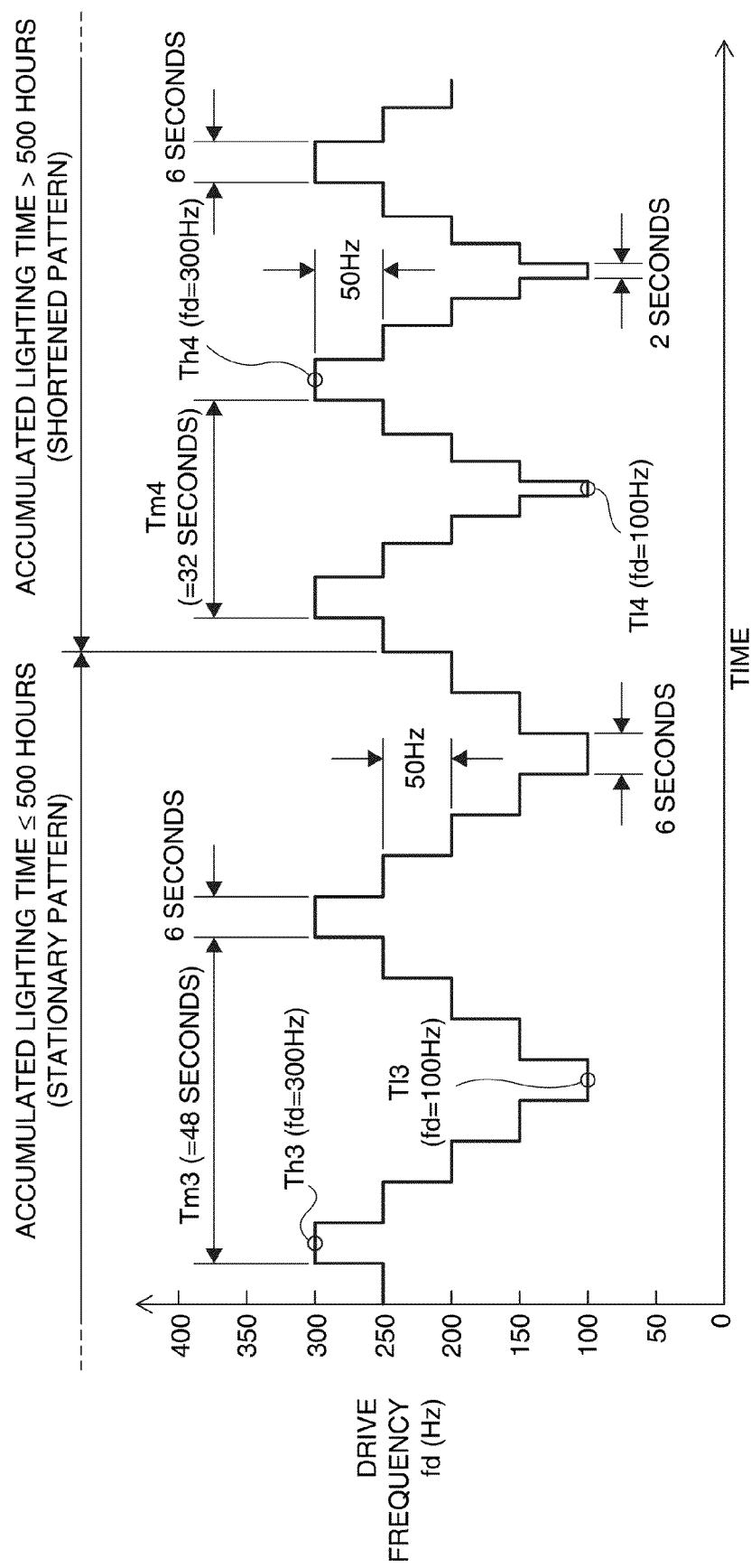
FIG. 8 is a diagram illustrating how the modulation pattern is modified in a second embodiment.

FIG. 8 is a diagram showing how the modulation pattern is modified in the second embodiment. The second embodiment is different from the first embodiment in the modulation patterns before and after modification, namely in the stationary pattern and the shortened pattern. The other points are the same as in the first embodiment.

As shown in FIG. 8, in the stationary pattern of the second embodiment, the retentive period during which the drive frequency fd is retained constant is set to be 6 seconds independently of the drive frequency fd. Further, in the stationary pattern of the second embodiment, the drive frequency fd in the lowest frequency period Tl3 is set to be 100 Hz, and the drive frequency fd in the highest frequency period Th3 is set to be 300 Hz. The variation step of the drive frequency fd is set to be 50 Hz similarly to the first embodiment. Therefore, the modulation period Tm3 in the stationary pattern in the second embodiment is arranged to be 48 seconds.

On the other hand, in the shortened pattern of the second embodiment, the retentive period is shortened by 1 second from 6 seconds in the highest frequency period Th4 to 2 seconds in the lowest frequency period Tl4, as the drive frequency fd becomes lower. The drive frequencies fd (100 Hz and 300 Hz) in the lowest frequency period Tl4 and the highest frequency period Th4, and the variation step (50 Hz) of the drive frequency fd are the same as those of the stationary pattern, respectively. Therefore, the modulation period Tm4 in the shortened pattern in the second embodiment is arranged to be 32 seconds. It should be noted that although in the shortened pattern in the second embodiment, the retentive period is shortened by 1 second every time the drive frequency fd decreases by 50 Hz, it is not necessarily required that the amount of shortening of the retentive period is constant, but can appropriately be set for every value of the drive frequency fd.

As described above, in the second embodiment, when the accumulated lighting time exceeds the predetermined time, the modulation pattern of the drive frequency is set to be the shortened pattern with the retentive period the length of which is shortened as the drive frequency fd becomes lower. Therefore, the period of time during which the low frequency driving is performed can be shortened, thus the flicker can be prevented from occurring. Further, according to the second embodiment, sufficiently long period of time during which the high frequency driving is performed can be obtained. Therefore, since the extension of the projection 538*b* in the high frequency driving mode can sufficiently be performed as shown in FIG. 5C, the distance between the electrodes 532, 542 can be prevented from increasing to raise the lamp voltage.

It should be noted that although in the second embodiment, the retentive period is shortened as the drive frequency fd becomes lower, in general, it is sufficient that the length of the retentive period at a certain drive frequency is shorter than the length of the retentive period at a drive frequency higher than the certain drive frequency. Also in such a configuration, it is possible to shorten the period of time during which the low frequency driving is performed, and at the same time, to increase the period of time during which the high frequency driving is performed. Further, although in the second embodiment, the length of the highest frequency period Th3 of the stationary pattern and the length of the highest frequency period Th4 of the shortened pattern are arranged to be the same, it is not necessarily required that the lengths of the periods Th3, Th4 are equal to each other. If the retentive period at a frequency lower than a predetermined frequency in the shortened pattern is shorter than the retentive period at the frequency lower than the predetermined frequency in the stationary pattern, the highest frequency period Th4 in the shortened pattern can be longer than the highest frequency period Th3 in the stationary pattern, or the highest frequency period Th3 in the stationary pattern can be longer than the highest frequency period Th4 in the shortened pattern.

C. Third Embodiment

Figure 9:
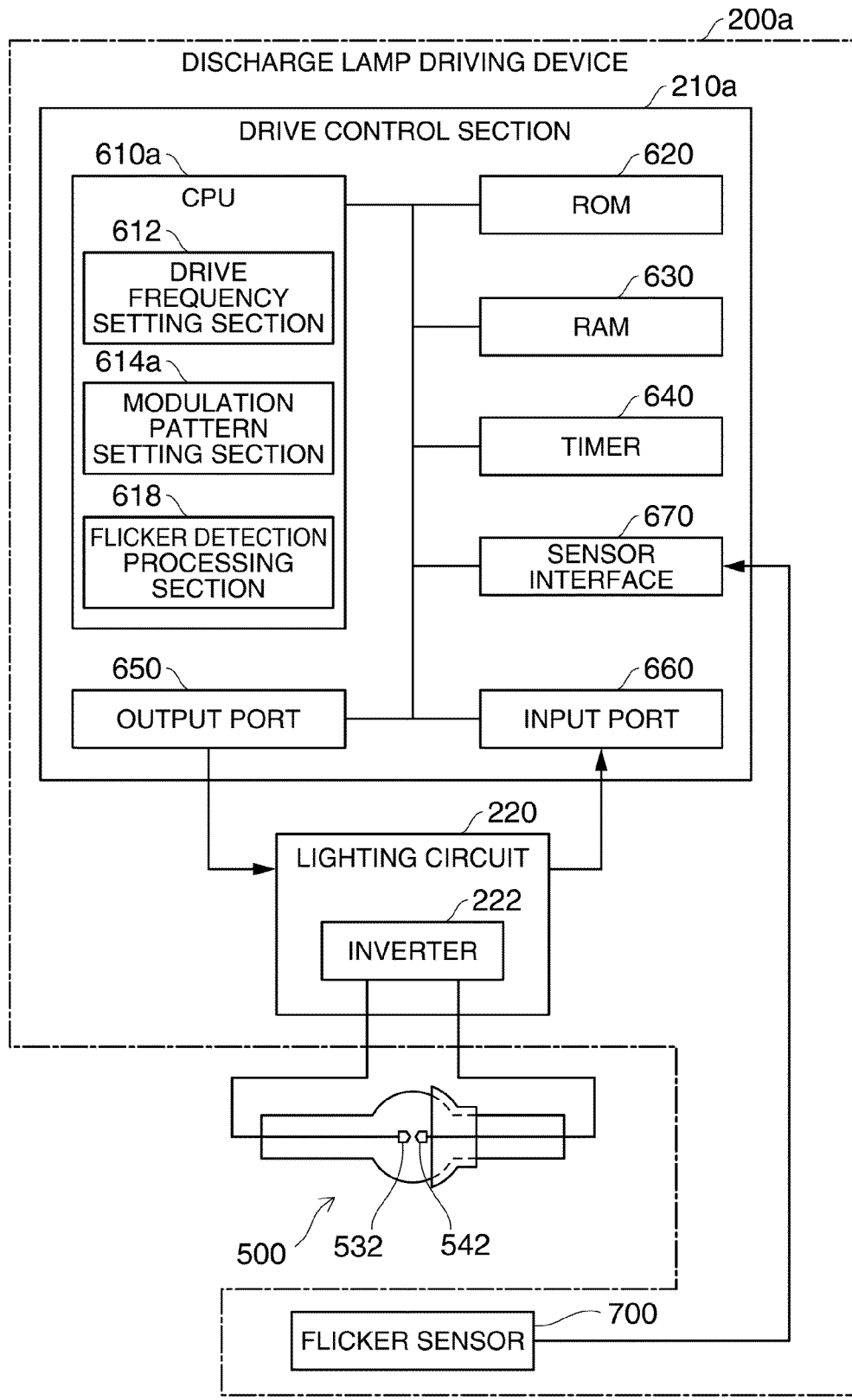
FIG. 9 is a block diagram illustrating a configuration of a discharge lamp driving device in a third embodiment.

FIG. 9 is a block diagram showing a configuration of a discharge lamp driving device 200*a* in a third embodiment. The discharge lamp driving device 200*a* of the third embodiment is different from the discharge lamp driving device 200 (FIG. 3) of the first embodiment in the point that a flicker sensor 700 disposed adjacently to the discharge lamp 500 is provided, the point that the drive control section 210*a* is provided with a sensor interface 670 to which an output signal from the flicker sensor 700 is supplied, and the point that the CPU 610*a* realizes a function as a flicker detection processing section 618 instead of the lighting time accumulation section 616. Further, the modulation pattern setting section 614*a* is different from the modulation pattern setting section 614 of the first embodiment in the point that the modulation pattern is modified in accordance with the state of occurrence of the flicker detected by the flicker detection processing section 618. The other points are substantially the same as in the first embodiment.

The flicker sensor 700 detects the variation in the position of the arc AR (FIG. 2) occurring in the discharge lamp 500. The flicker sensor 700 in the third embodiment can be composed of a light receiving element such as a photodiode or a phototransistor, and a slit or a pinhole for varying the light intensity of the light entering the light receiving element in accordance with the variation in the position at which the arc occurs. It should be noted that the configuration of the flicker sensor 700 can arbitrarily be modified providing that the variation in the position at which the arc occurs can be detected. For example, as the flicker sensor 700 for detecting the variation in the position of the arc, a line sensor or an area sensor composed of charge-coupled devices (CCD) or the like can also be used.

The flicker detection processing section 618 analyzes the output signal from the flicker sensor 700 acquired via the sensor interface 670 to detect the state of occurrence of the flicker in the discharge lamp 500. The state of occurrence of the flicker can be detected based on the amount of variation in the light intensity of the light entering the light receiving element provided to the flicker sensor 700, for example. In this case, if the amount of variation exceeds a predetermined reference amount, it is determined that the flicker occurs. It should be noted that the detection of the flicker in the flicker detection processing section 618 is appropriately modified in accordance with the configuration of the flicker sensor 700.

Figure 10:
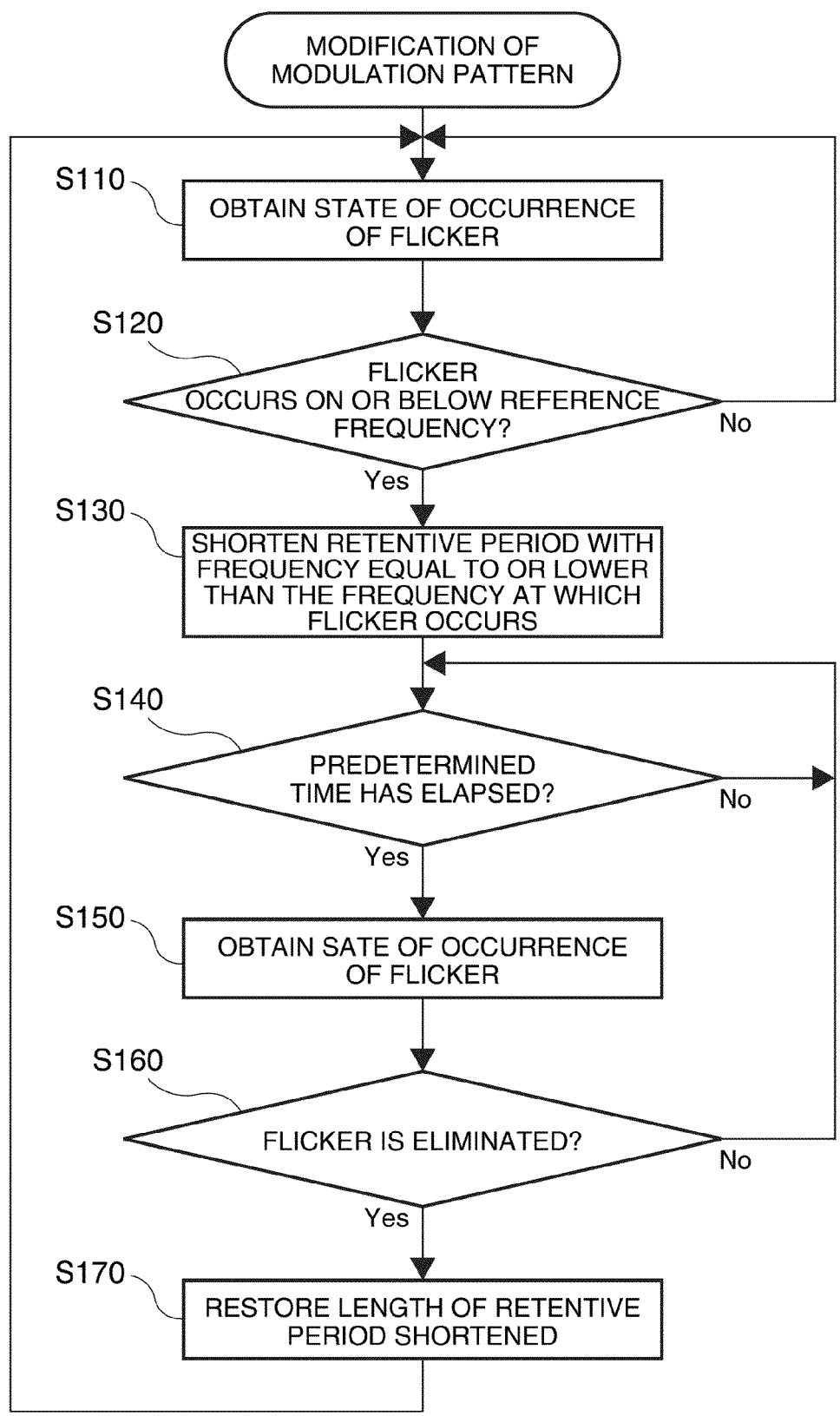
FIG. 10 is a flowchart illustrating a flow of a process for modifying the modulation pattern in the third embodiment.

FIG. 10 is a flowchart showing a flow of a process of the modulation pattern setting section 614*a* of the third embodiment modifying the modulation pattern. The process of modifying the modulation pattern is repeatedly executed during the period in which the discharge lamp 500 is in the lighting state.

In the step S110, the modulation pattern setting section 614*a* obtains the state of occurrence of the flicker. Specifically, the modulation pattern setting section 614*a* obtains the state of occurrence of the flicker from the flicker detection processing section 618.

In the step S120, the modulation pattern setting section 614*a* determines whether or not the flicker occurs in the retentive period with the drive frequency equal to or lower than a predetermined reference frequency (e.g., 200 Hz). If it is determined that the flicker occurs in the retentive period with the drive frequency equal to or lower than the reference frequency, the process proceeds to the step S130. On the other hand, if it is determined that the flicker does not occur in the retentive period with the drive frequency equal to or lower than the reference frequency, the process returns to the step S110, and the two steps S110, S120 are executed repeatedly.

In the step S130, the modulation pattern setting section 614*a* modifies the modulation pattern, thereby shortening the retentive period with the drive frequency equal to or lower than the frequency at which the flicker occurs. The modification of the modulation pattern is performed when the drive frequency fd is switched from 200 Hz to 250 Hz similarly to the case of the first embodiment. It should be noted that the modification of the modulation pattern can be performed at an arbitrary point of time.

In the step S140, the modulation pattern setting section 614*a* determines whether or not predetermined time has elapsed after modifying the modulation pattern. If it is determined that the predetermined time has elapsed, the process proceeds to the step S150. On the other hand, if it is determined that the predetermined time has not yet elapsed, the step S140 is executed repeatedly until the predetermined time elapses. It should be noted that the predetermined time is set to be the time (e.g., 10 through 20 minutes) necessary for the shape of the projection to change to the extent that the occurrence of the flicker in the low frequency driving mode can be prevented.

In the step S150, the modulation pattern setting section 614*a* obtains the state of occurrence of the flicker similarly to the step S110. Then, in the step S160, the modulation pattern setting section 614*a* determines whether or not the flicker, which has been determined to occur in the step S120, is eliminated. If it is determined that the flicker has been eliminated, the process proceeds to the step S170. On the other hand, if it is judged that the flicker has not yet been eliminated, the process returns to the step S140, and the steps S140 through S160 are executed until the flicker is eliminated. It should be noted that when making the determination on whether or not the flicker is eliminated, one may temporarily restore the length of the shortened retentive to the length thereof before the shortening in order for determining the elimination of the flicker more reliably.

In the step S170, the modulation pattern setting section 614a restores (hereinafter also referred to as "restoration") the length of the retentive period, which was shortened in the step S130, to its original length. The restoration of the retentive period can be performed by, for example, changing the modulation pattern to be set into the drive frequency setting section 612 to the modulation pattern before shortening stored in the ROM 620 or the RAM 630. After the restoration of the retentive period in the step S170, the process returns to the step S110, and the steps S110, S120 are executed repeatedly until the flicker occurs in the retentive period with the drive frequency equal to or lower than the reference frequency.

Figure 11:
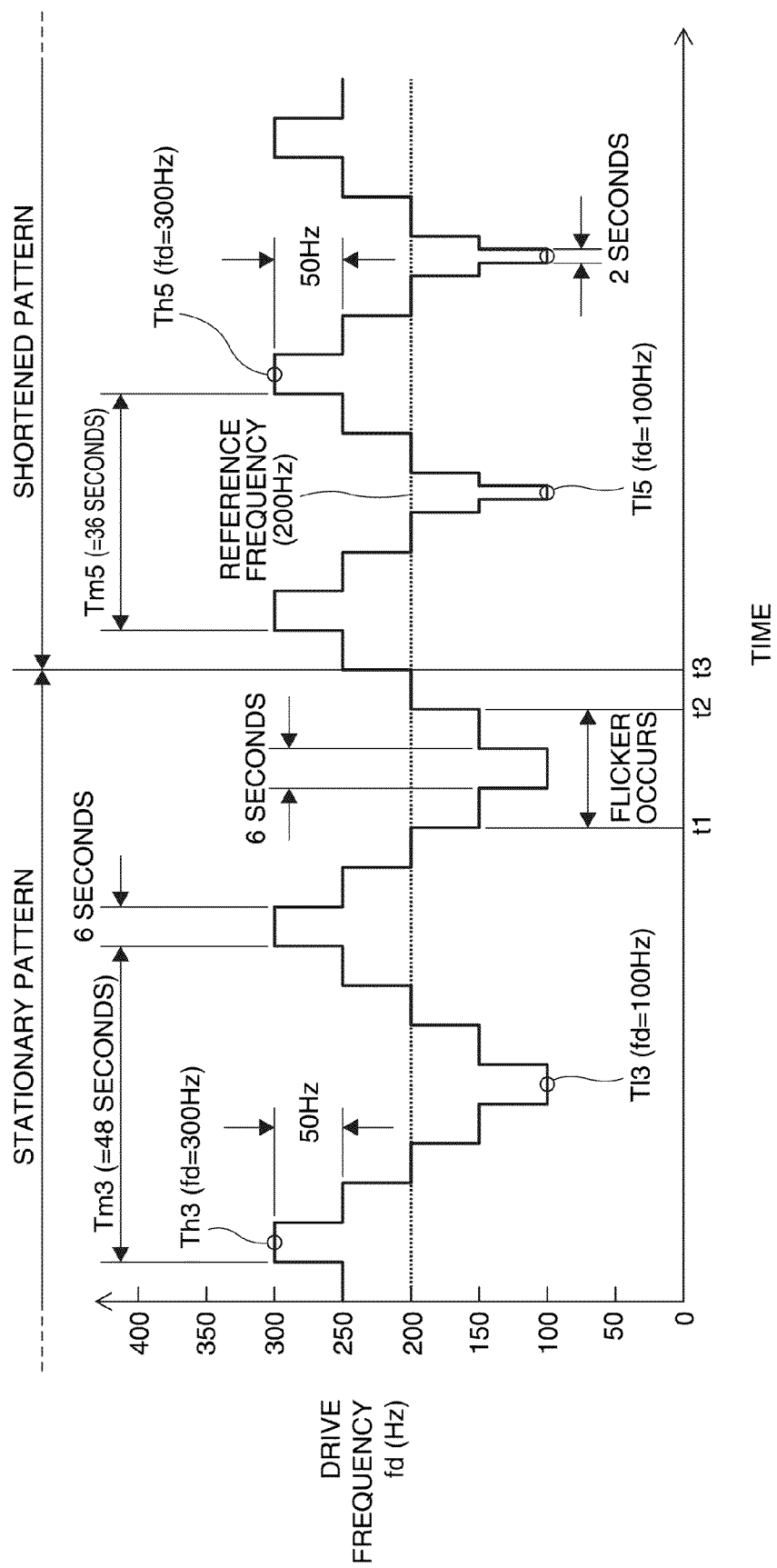
FIG. 11 is a diagram illustrating how the modulation pattern is modified in a third embodiment.

FIG. 11 is an explanatory diagram showing how the modulation pattern is modified by the modification process for the modulation pattern shown in FIG. 10. The modulation pattern before shortening the retentive period, namely the stationary pattern, shown in FIG. 11 is the same as in the second embodiment.

In the example shown in FIG. 11, no flicker occurs prior to the time point t1. Then, in the time period between the time points t1 and t2, the flicker occurs. Therefore, it is determined that the flicker occurs in the retentive period started from the time point t1 with the drive frequency fd of 150 Hz, namely at the drive frequency lower than the reference frequency (200 Hz) (step S120). Subsequently, the modulation pattern is modified to be the shortened pattern at the time point t3 at which the drive frequency fd is switched from 200 Hz to 250 Hz (step S130).

In the example shown in FIG. 11, since the flicker occurs at the drive frequency fd of 150 Hz, in the shortened pattern the retentive periods with the drive frequencies fd of 150 Hz and 100 Hz are shortened to be 2 seconds, namely a third as long as in the stationary pattern. Therefore, the modulation period Tm5 in the shortened pattern becomes 36 seconds. It should be noted that the extent of the shortening of the retentive period can appropriately be modified.

As described above, in the third embodiment, by shortening the retentive periods with the drive frequencies equal to or lower than the frequency at which the flicker occurs, the period of time during which the low frequency drive is performed is shortened, thus it becomes possible to prevent the flicker from occurring. Further, since according also to the third embodiment, it is possible to provide sufficiently long period of time during which the high frequency drive is executed, rise in the lamp voltage can be prevented.

Although in the third embodiment, all of the retentive periods with the drive frequencies fd equal to or lower than the frequency at which the flicker occurs are shortened, it is also possible to arrange that only the retentive periods with the drive frequency equal to the frequency at which the flicker occurs are shortened. Further, it is also possible to arrange that if the flicker occurs at a frequency equal to or lower than the reference frequency, all of the retentive periods with the drive frequencies equal to or lower than the reference frequency are shortened. In general, when the flicker occurs, one may shorten at least one retentive period with the drive frequency equal to or lower than the reference frequency, it is also possible to shorten all of the retentive periods similarly to the shortened pattern of the first embodiment, or it is also possible to arrange that the retentive period is shortened as the drive frequency thereof becomes lower similarly to the shortened pattern in the second embodiment.

Further, in the third embodiment, although whether or not the flicker is eliminated is determined when the predetermined time has elapsed after the modulation pattern is modified to be the shortened pattern (steps S140 through S160), it is also possible to arrange that whether or not the flicker is eliminated is determined without waiting the elapse of the predetermined time. By determining the elimination of the flicker after the predetermined time has elapsed in the point that the tapered projection 538b (FIG. 5C) is formed until the predetermined time elapses, it is possible to prevent the reoccurrence of the flicker when the retentive period is restored.

Although in the third embodiment, the length of the retentive period once shortened is restored when the flicker is eliminated, it is also possible to arrange that the restoration of the length of the retentive period is not executed. In this case, it is also possible to arrange that the shortened retentive period is kept until, for example, the discharge lamp 500 is put off, or the discharge lamp driving device 200a is powered off, and then the length of the retentive period is restored at the beginning of lighting of the discharge lamp 500, or when the discharge lamp driving device 200a is powered on. Further, it is also possible to arrange that the restoration of the length of the retentive period is not performed at all. One may restore the shortened length of the retentive period when the flicker is eliminated to the point that the minute projection, which can be formed in the high frequency driving mode, can be eliminated by restoring the length of the retentive period. As such, the occurrence of the flicker due to the formation of the minute projections can be prevented.

D. Fourth Embodiment

Figure 12:
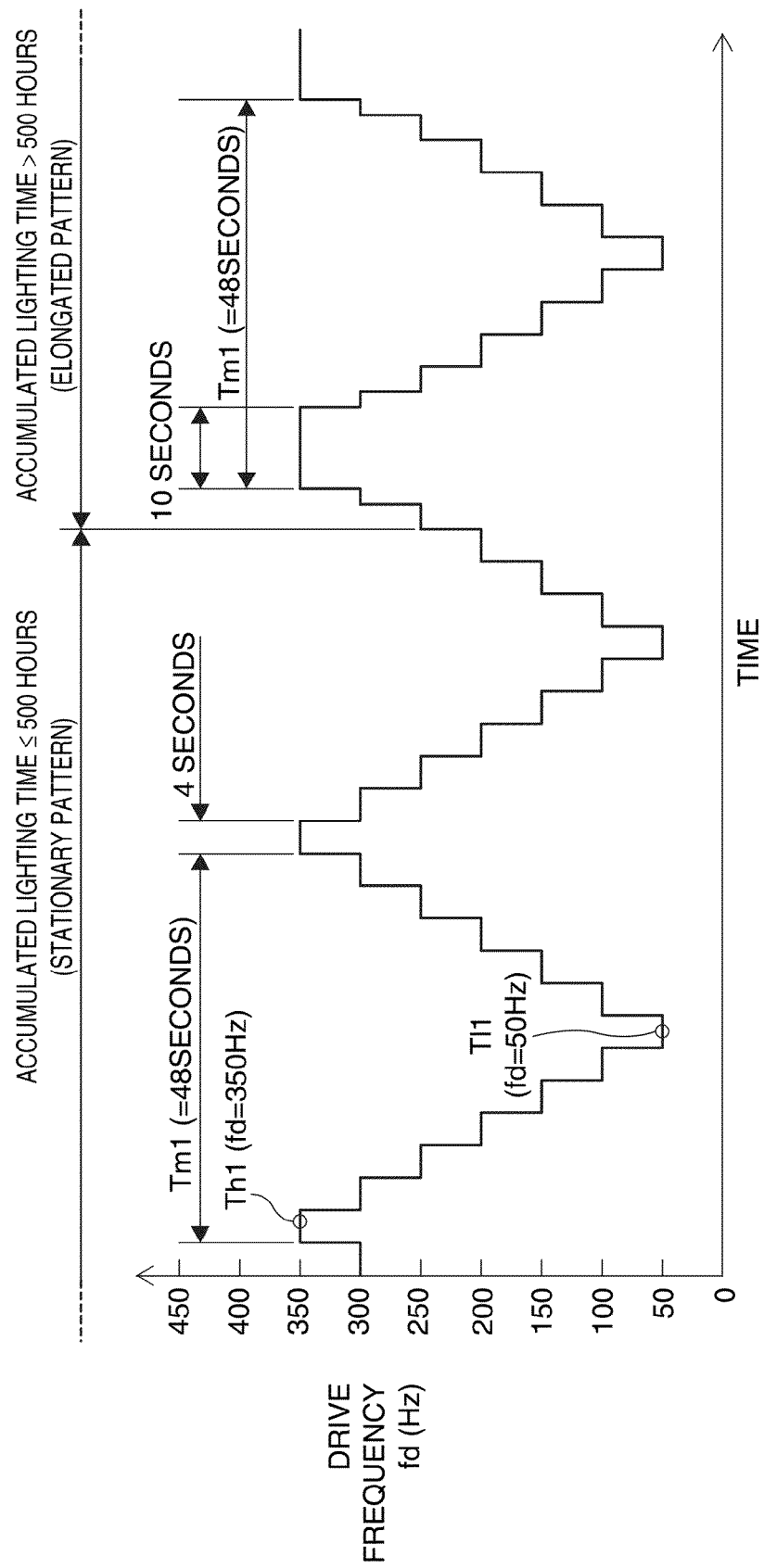
FIG. 12 is a diagram illustrating how the modulation pattern is modified in a fourth embodiment.

FIG. 12 is a diagram showing how the modulation pattern is modified in a fourth embodiment. The fourth embodiment is different from the first embodiment in the modulation pattern around the modification. The other points are the same as in the first embodiment.

As shown in FIG. 12, in the stationary pattern of the fourth embodiment, the retentive period during which the drive frequency fd is retained constant is set to be 4 seconds independently of the drive frequency fd. Further, in this stationary pattern, the drive frequency fd in the lowest frequency period Tl1 is set to be 50 Hz, and the drive frequency fd in the highest frequency period Th1 is set to be 350 Hz. The variation step of the drive frequency fd is set to be 50 Hz similar to the first embodiment. Therefore, the modulation period Tm1 in the stationary pattern in the fourth embodiment is arranged to be 48 seconds.

In the fourth embodiment, when the accumulated lighting time exceeds a predetermined period of time (500 hours in the example shown in FIG. 12), the modulation pattern of the drive frequency is set to be an elongated pattern with the highest frequency period Th1 longer than in the case of the stationary pattern. In other words, the highest frequency period Th3 is changed from 4 seconds corresponding to the stationary pattern to 10 seconds corresponding to the elongated pattern. In this condition, the retentive periods corresponding respectively to the drive frequencies fd of 300 Hz and 250 Hz are changed to 2.5 seconds so that the modulation period of the drive frequency fd becomes the same between the case of the stationary pattern and the case of the elongated pattern of the drive frequency.

In general, if the electrode is deteriorated and the fusibility thereof is degraded, the projection may begin to have a shape with a flat tip having a large thermal capacity when the drive frequency fd is low, and unevenness may be formed on the surface of the projection. As such, the possibility of occurrence of the flicker rises. In contrast, in the fourth embodiment having the configuration described above, since there is adopted the configuration in which the highest frequency period Th1 becomes longer when a predetermined condition is satisfied (for example, in the fourth embodiment, when the accumulated lighting time exceeds the predetermined time) compared to the case in which the predetermined condition has not been satisfied yet, the minute projection can be formed to reduce the thermal capacity in the highest frequency period Th1. Thus, the fusibility of the surface of the projection may be maintained. Therefore, it becomes possible to prevent the flicker from occurring.

E. Fifth Embodiment

Figure 13:
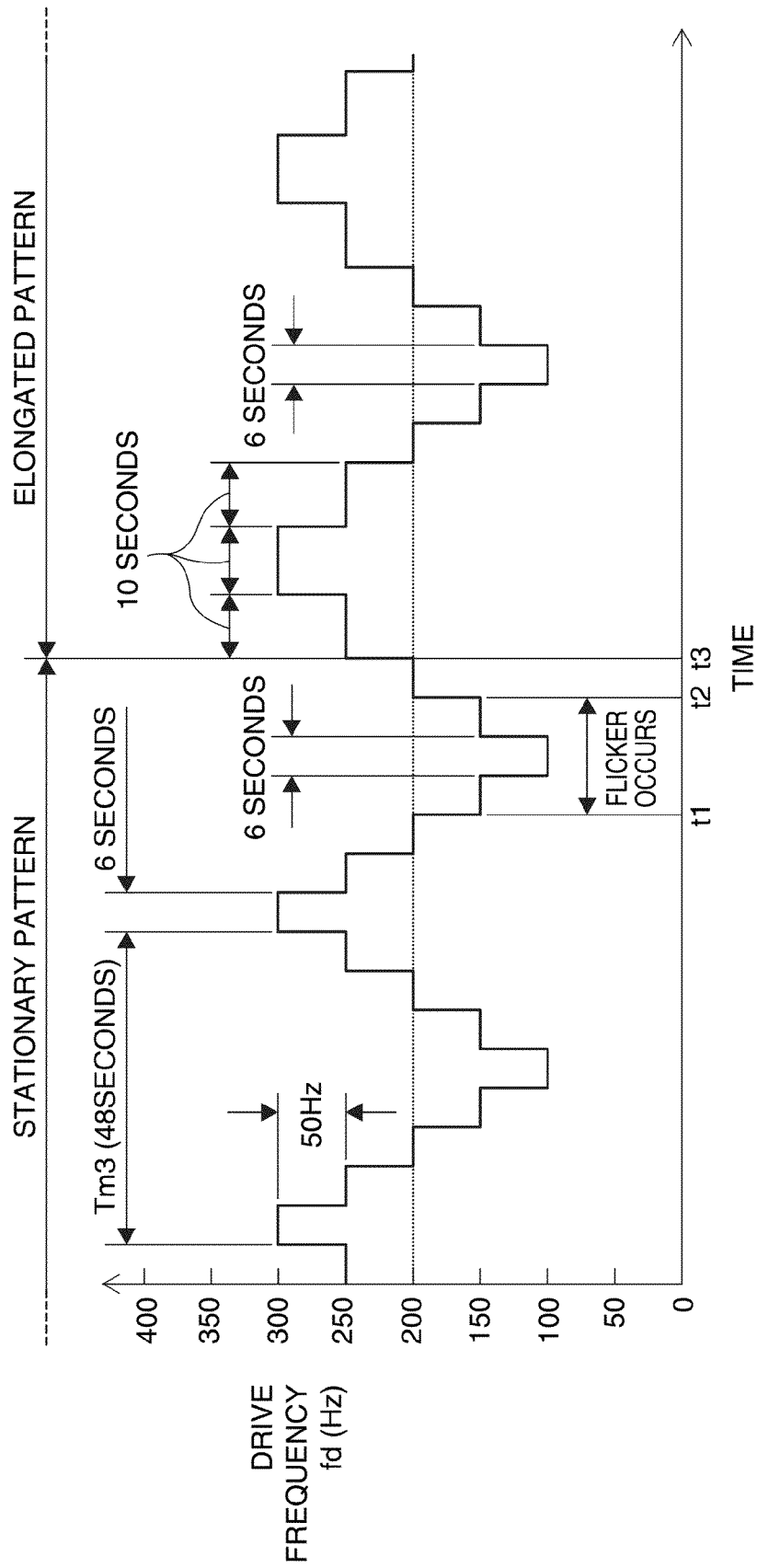
FIG. 13 is a diagram illustrating how the modulation pattern is modified in a fifth embodiment.

FIG. 13 is a diagram showing how the modulation pattern is modified in a fifth embodiment. The fifth embodiment is different from the second embodiment in the modulation pattern around the modification. The other points are the same as in the second embodiment. In the fourth embodiment, the modulation pattern (the elongated pattern) after the modification is configured to have the highest frequency period Th3 longer than in the case of the stationary pattern. In contrast, in the fifth embodiment, the elongated pattern is configured so that all of the retentive periods with the frequency higher than the predetermined reference frequency are longer than in the case of the stationary pattern.

In the fifth embodiment, as shown in FIG. 13, the retentive periods with the drive frequencies of 250 Hz and 300 Hz, respectively, exceeding the predetermined reference frequency (e.g., 200 Hz) are changed from 6 seconds corresponding to the stationary pattern to 10 seconds corresponding to the elongated pattern. In the case in which the drive frequency is equal to or lower than the reference frequency, the retentive periods are 6 seconds without the change in both of the stationary pattern and the elongated pattern.

In the fifth embodiment having the configuration described above, similar to the fourth embodiment, the unevenness on the surface of the projection generated when the drive frequency fd is low can be reduced. Therefore, it becomes possible to prevent the flicker from occurring.

F. Modified Examples

It should be noted that the disclosure is not limited to the embodiments or the specific examples described above, but can be put into practice in various forms within the scope or the spirit of the disclosure. By way of example, the following modifications are also possible.

F1. Modified Example 1

The modulation pattern shown in each of the embodiments described above is nothing more than an example, and the modulation range (i.e., the drive frequencies in the highest frequency periods Th1 through Th5 and the lowest frequency periods Tl1 through Tl5) of the drive frequency, the number of retentive periods during which the drive frequency is retained constant, the length of the retentive period, the variation amount of the drive frequency, and so on can appropriately be modified in accordance with the characteristic of the discharge lamp 500 and so on. In general, one may perform the modulation of the drive frequency by providing a plurality of periods having the drive frequencies different from each other in the modulation period. For example, it is also possible that the lengths of the retentive periods can be different between the drive frequencies, and further, it is also possible to arrange that the drive frequency is not switched stepwise. Also in such a configuration, occurrence of the flicker in the low frequency driving mode can be prevented by shortening the retentive period with the drive frequency equal to or lower than the predetermined frequency. Further, it is also possible to adopt the configuration in which only the lowest frequency period is shortened in the case in which the predetermined condition is satisfied, compared to the case in which the predetermined condition has not been satisfied yet.

F2. Modified Example 2

Although the configuration of shortening at least one period having the frequency equal to or lower than the predetermined reference frequency is adopted in the embodiments 1 through 3, and the configuration of elongating at least one period having the frequency exceeding the predetermined reference frequency is adopted in the embodiment 4, the "predetermined reference frequency" is not limited to 200 Hz, but can arbitrarily be modified in accordance with the characteristic of the discharge lamp 500 providing the flicker is apt to occur at the frequency. Further, the "predetermined reference frequency" in the first through third embodiments shortening the period and the "predetermined reference frequency" in the fourth and fifth embodiments elongating the period are not necessarily the same, but can take values different from each other.

F3. Modified Example 3

Although in each of the embodiments described above, the modulation pattern is switched from the stationary pattern to the shortened pattern based on the deterioration state of the discharge lamp 500 and the actual occurrence of the flicker, it is also possible to switch the modulation pattern based on other conditions. For example, in the case in which the discharge lamp driving device 200 is configured to be able to drive the discharge lamp 500 with power lower than the rated power, it is also possible to arrange that the stationary pattern is used when driving the discharge lamp 500 with the rated power, while the shortened pattern is used when driving the discharge lamp 500 with the power (low power) lower than the rated power. It should be noted that the power used as the basis of the switching of the modulation pattern is not necessarily limited to the rated power. In general, it is also possible to arrange that the stationary pattern is used in the case in which the drive power of the discharge lamp is equal to or greater than a predetermined reference power, and the shortened pattern is used in the case in which the drive power of the discharge lamp is smaller than the predetermined reference power.

FIGS. 14A and 14B are explanatory diagrams showing how the arc AR occurs when the low frequency drive is continued in a low power driving mode. FIG. 14A shows the state of occurrence of the arc AR at the beginning of the low frequency driving mode, and FIG. 14B shows the state of occurrence of the arc AR during the low frequency driving mode.

As described above, in the case in which the drive frequency fd is high, the area in the projection 538d in the anode state the temperature of which rises becomes small. Therefore, also in the low power driving mode, the hot spot HRd with sufficiently high temperature is formed at the tip of the projection at the beginning of the low frequency driving mode as shown in FIG. 14A. As described above, since the hot spot HRd is provided to the projection 538d, the arc AR occurs from the position of the hot spot HRd, namely the tip of the projection 538d.

In contrast, when continuing the low frequency driving in the low power driving mode in which the temperature of the entire electrode 532 drops, since the area the temperature of which rises extends due to the low frequency driving, the temperature of the tip of the projection 538d does not rise sufficiently. Therefore, during the low frequency driving mode, the temperature of the tip of the projection 538d does not sufficiently rise, and the hot spot HRd formed at the beginning of the low frequency driving mode disappears as shown in FIG. 14B. If the hot spot HRd with the sufficiently high temperature disappears as described above, it becomes that the position from which the electron e⁻ is apt to be emitted is not fixed, and the arc AR occurs from a random position on the projection 538d, and therefore, the possibility of occurrence of the flicker becomes higher.

By thus using the stationary pattern as the modulation pattern in the rated power driving mode and using the shortened pattern in the low power driving mode, it becomes possible to prevent the flicker from occurring in the low power driving mode.

It should be noted that it is also possible to perform switching of the modulation pattern based on a plurality of conditions instead of a single condition. For example, it is also possible to arrange that in the rated power driving mode, switching of the modulation pattern is performed based on the deterioration state of the discharge lamp 500 and the occurrence of the flicker, and in the low power driving mode, the shortened pattern is used irrespectively of the deterioration state of the discharge lamp 500 or the occurrence of the flicker. Further, the basis used when switching the modulation pattern based on the deterioration state of the discharge lamp 500 can be made different between the rated power driving mode and the low power driving mode.

F4. Modified Example 4

Figure 15A:
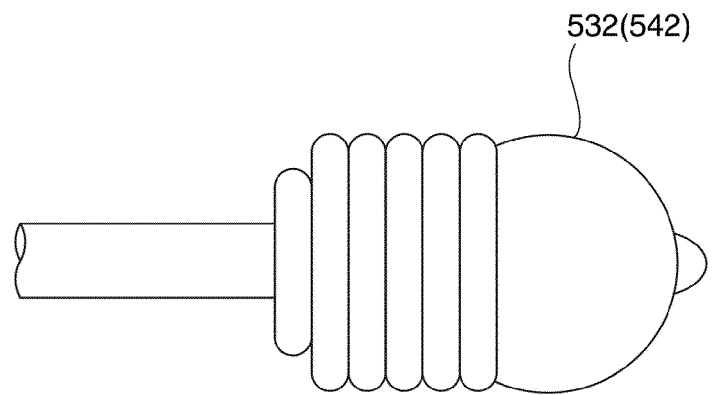
FIGS. 15A and 15B are explanatory diagrams illustrating a modified example of the electrode provided to the discharge lamp in comparison with the embodiments described above.
Figure 15B:
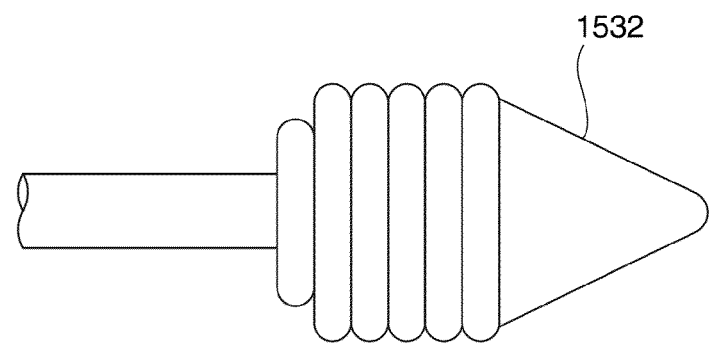

FIGS. 15A and 15B are explanatory diagrams showing a modified example of the electrode provided to the discharge lamp in comparison with the embodiments described above. FIG. 15A shows a shape of the electrode 532 (542) in the embodiments described above, and FIG. 15B shows a shape of the electrode in the modified example 4. As shown in FIG. 15A, the tip of the electrode 532 (542) in the embodiments described above forms a spherical surface. FIGS. 5A through 5C, and 6A and 6B explained above also show that the tip has a spherical shape. As described above, it becomes possible to enhance the effect of restoring the modification in the deterioration by making the tip of the electrode have a spherical shape.

In contrast, in FIG. 15B, the tip of the electrode 1532 has a conical shape. According to this configuration, the flicker can also be prevented from occurring similarly to each of the embodiments. In other words, the tip of the electrode 1532 is not required to have a spherical shape, but can be made to have various shapes such as a conical shape.

F5. Modified Example 5

Although in each of the embodiments described above the liquid crystal light valves 330R, 330G, 330B are used as the light modulation sections in the projector 1000 (FIG. 1), it is also possible to use other arbitrary modulation sections such as digital micromirror devices (DMD, a trademark of Texas Instruments) as the light modulation sections. Further, the disclosure can also be applied to various types of image display devices, exposure devices, illumination devices, and so on including the liquid crystal display devices as long as the devices use the discharge lamp as the light source. Therefore, it is manifestly intended that embodiments in accordance with the present disclosure be limited only by the claims and the equivalents thereof.

What is claimed is:

1. A driving device for a discharge lamp, comprising:
    an alternating current supply section configured to supply two electrodes of the discharge lamp with an alternating current, the alternating current comprising a plurality of modulation periods; and
    a frequency modulation section configured to modulate a frequency of the alternating current in accordance with a predefined modulation pattern, the predefined modulation pattern comprising a plurality of retentive periods within each of the modulation periods, each retentive period having a constant frequency that is different from a frequency of temporally adjacent retentive periods,
    wherein the frequency modulation section makes a length of at least one of the retentive periods in the modulation period shorter in response to at least two conditions being met: (a) a predetermined condition occurring, and (b) the frequency of the at least one of the retentive periods is equal to or less than a predetermined reference frequency, and
    the frequency modulation section is configured to modulate the frequency of the alternating current in accordance with the predefined modulation pattern when the at least two conditions are not met.

2. The driving device according to claim 1, wherein the each of the modulation periods includes a first retentive period having a first frequency and a second retentive period having a second frequency, the second frequency being higher than the first frequency, and wherein the shortening of the retentive periods includes shortening a length of the first retentive period to be shorter than a length of the second retentive period.

3. The driving device according to claim 1, wherein the shortening of the retentive periods includes shortening a length of the retentive period in accordance with the frequency of the retentive period such that the lower the frequency the shorter the length of the retentive period.

4. The driving device according to claim 1, wherein the frequency modulation section shortens each of the retentive periods in the modulation period in response to the occurrence of the predetermined condition.

5. The driving device according to claim 1, further comprising a flicker detection processing section configured to detect an occurrence of a flicker in the discharge lamp as a criterion of the predetermined condition,
    wherein the frequency modulation section performs the shortening when the flicker is detected in the retentive periods with the frequency equal to or less than the reference frequency.

6. The driving device according to claim 5, wherein after a predetermined time has elapsed since the shortening of the retentive periods, the frequency modulation section determines whether the flicker still occurs at the frequency at which the flicker had been detected, and if not, the frequency modulation section restores the length of the shortened retentive period to a length prior to the shortening.

7. The driving device according to claim 1, wherein
    the predetermined condition is determined based on a deterioration state of the discharge lamp, and the frequency modulation section performs the shortening in response to a determination that a deterioration of the discharge lamp is in progress.

8. The driving device according to claim 7, further comprising:
a lighting time accumulation section configured to calculate an accumulated lighting time from a beginning of use of the discharge lamp as a parameter representing the deterioration state of the discharge lamp, and
wherein the frequency modulation section performs the shortening in response to the accumulated lighting time exceeding a predetermined upper time limit.

9. The driving device according to claim 1, wherein
the alternating current supply section is configured to modify a power supplied to the discharge lamp, and
the frequency modulation section performs the shortening in response to the power supplied to the discharge lamp being lower than a predetermined reference power.

10. An image display apparatus comprising:
a discharge lamp as a light source configured to display an image;
an alternating current supply section configured to supply two electrodes of the discharge lamp with an alternating current to light the discharge lamp, the alternating current comprising a plurality of modulation periods; and
a frequency modulation section configured to modulate a frequency of the alternating current in accordance with a predefined modulation pattern, the predefined modulation pattern comprising a plurality of retentive periods within each of the modulation periods, each retentive period having a constant frequency that is different from a frequency of temporally adjacent retentive periods,
wherein the frequency modulation section makes a length of at least one of the retentive periods in the modulation period shorter in response to at least two conditions being met: (a) a predetermined condition occurring, and (b) the frequency of the at least one of the retentive periods is equal to or less than a predetermined reference frequency, and
the frequency modulation section is configured to modulate the frequency of the alternating current in accordance with the predefined modulation pattern when the at least two conditions are not met.

11. The image display apparatus according to claim 10, wherein the each of the modulation periods includes a first retentive period having a first frequency and a second retentive period having a second frequency, the second frequency being higher than the first frequency, and wherein the shortening of the retentive periods includes shortening a length of the first retentive period to be shorter than a length of the second retentive period.

12. The image display apparatus according to claim 10, wherein
the predetermined condition is based on a deterioration state of the discharge lamp, and
the frequency modulation section performs the shortening in response to a determination that a deterioration of the discharge lamp is in progress.

13. The image display apparatus according to claim 10, wherein
the alternating current supply section is configured to modify a power supplied to the discharge lamp, and
the frequency modulation section performs the shortening in response to the power supplied to the discharge lamp being lower than a predetermined reference power.

14. A driving method for a discharge lamp, comprising:
supplying an alternating current between two electrodes of the discharge lamp, the alternating current comprising a plurality of modulation periods;
modulating a frequency of the alternating current in accordance with a predefined modulation pattern, the predefined modulation pattern comprising a plurality of retentive periods within each of the modulation periods, each retentive period having a constant frequency that is different from a frequency of temporally adjacent retentive periods; and
shortening a length of at least one of the retentive periods in the modulation period in response to at least two conditions being met: (a) a predetermined condition occurring, and (b) the frequency of the at least one of the retentive periods is being equal to or less than a predetermined reference frequency,
wherein the modulating of the frequency of the alternating current is performed in accordance with the predefined modulation pattern when the at least two conditions are not met.

* * * * *